United States Patent
Iyer et al.

(10) Patent No.: US 11,627,009 B2
(45) Date of Patent: Apr. 11, 2023

(54) SESSION MANAGEMENT OF CONTENT DRIVEN MEETING SUMMARIES, ACTION ITEMS, MEETING CONTEXT CONTINUITY, AND SEGMENT AUDIO-VIDEO (AV) REPLAY FOR COLLABORATION SOLUTIONS

(71) Applicant: Dell Products L.P., Hopkinton, MA (US)

(72) Inventors: Vivek Viswanathan Iyer, Austin, TX (US); Loo Shing Tan, Singapore (SG); Ruizhi Joyce Lu, Singapore (SG); Mark John Law, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/156,166

(22) Filed: Jan. 22, 2021

(65) Prior Publication Data

US 2022/0239516 A1  Jul. 28, 2022

(51) Int. Cl.
| | |
|---|---|
| H04L 12/18 | (2006.01) |
| H04N 7/15 | (2006.01) |
| G06Q 10/0631 | (2023.01) |
| G06Q 10/10 | (2023.01) |

(52) U.S. Cl.
CPC ... *H04L 12/1831* (2013.01); *G06Q 10/06316* (2013.01); *G06Q 10/103* (2013.01); *H04N 7/155* (2013.01)

(58) Field of Classification Search
CPC ............ G06Q 10/06316; G06Q 10/103; H04L 12/1831; H04N 7/155
See application file for complete search history.

(56) References Cited

U.S. PATENT DOCUMENTS

| | | | | |
|---|---|---|---|---|
| 6,119,147 A | * | 9/2000 | Toomey | H04L 12/1831 719/329 |
| 7,653,705 B2 | * | 1/2010 | Gudipaty | H04N 21/4335 709/204 |
| 7,895,157 B2 | * | 2/2011 | Bedingfield, Sr. | G06F 16/487 707/627 |
| 8,312,081 B2 | * | 11/2012 | Yuan | H04L 67/148 709/204 |
| 9,641,563 B1 | * | 5/2017 | Kitada | H04N 21/43072 |
| 9,674,243 B2 | * | 6/2017 | Bader-Natal | H04L 65/1089 |
| 10,062,057 B2 | * | 8/2018 | Kitada | H04L 12/1822 |

(Continued)

*Primary Examiner* — George C Neurauter, Jr.
(74) *Attorney, Agent, or Firm* — Chamberlain, Hrdlicka, White, Williams & Aughtry

(57) ABSTRACT

A method for the session management of content driven meeting summaries and action items in a commercial environment, which may be tied to multiple back-end cloud services. The method employs an association based data structure directed to improving the organization and persistence of post-meeting generated content or collateral (e.g., meeting summaries, notes, action items, etc.). Further, a method for learned meeting context continuity for past context and future meeting proposals tied to current meeting context. The method may match key topics, conversations, and attendees to deduce relation; and, accordingly, provide suitable next meeting predictions. Moreover, a method for intelligently managing segment audio-visual (AV) replay access, which may be indexed using users, topics, presenters, keywords, etc.

17 Claims, 21 Drawing Sheets

(56) References Cited

U.S. PATENT DOCUMENTS

| | | | | |
|---|---|---|---|---|
| 10,250,592 | B2* | 4/2019 | Malatesha | G06F 9/542 |
| 10,268,990 | B2* | 4/2019 | Kitada | G06Q 10/10 |
| 10,298,635 | B2* | 5/2019 | Malatesha | H04L 65/403 |
| 10,375,130 | B2* | 8/2019 | Malatesha | H04N 7/15 |
| 10,510,051 | B2* | 12/2019 | Nelson | H04L 12/1831 |
| 10,552,546 | B2* | 2/2020 | Nelson | G06F 40/58 |
| 10,553,208 | B2* | 2/2020 | Nelson | G10L 15/22 |
| 10,572,858 | B2* | 2/2020 | Nelson | H04N 7/155 |
| 10,785,450 | B1* | 9/2020 | van Rensburg | H04L 65/403 |
| 10,860,985 | B2* | 12/2020 | Nelson | G06Q 10/10 |
| 10,956,875 | B2* | 3/2021 | Nelson | G06Q 10/1095 |
| 10,972,295 | B1* | 4/2021 | van Rensburg | H04N 7/152 |
| 11,030,585 | B2* | 6/2021 | Nelson | G06Q 10/1095 |
| 11,120,342 | B2* | 9/2021 | Kitada | G06Q 10/06311 |
| 2004/0261013 | A1* | 12/2004 | Wynn | G06Q 10/10 |
| | | | | 715/201 |
| 2011/0249954 | A1* | 10/2011 | Meek | H04N 7/147 |
| | | | | 386/239 |
| 2012/0063573 | A1* | 3/2012 | Sylvain | H04L 65/4038 |
| | | | | 379/67.1 |
| 2013/0258039 | A1* | 10/2013 | Chazin | H04N 7/155 |
| | | | | 348/14.06 |
| 2018/0101281 | A1* | 4/2018 | Nelson | G06N 5/022 |
| 2018/0101760 | A1* | 4/2018 | Nelson | G06N 5/04 |
| 2019/0108494 | A1* | 4/2019 | Nelson | G06N 20/00 |
| 2019/0341050 | A1* | 11/2019 | Diamant | H04N 7/147 |
| 2020/0358832 | A1* | 11/2020 | Perreault | H04L 65/403 |

* cited by examiner

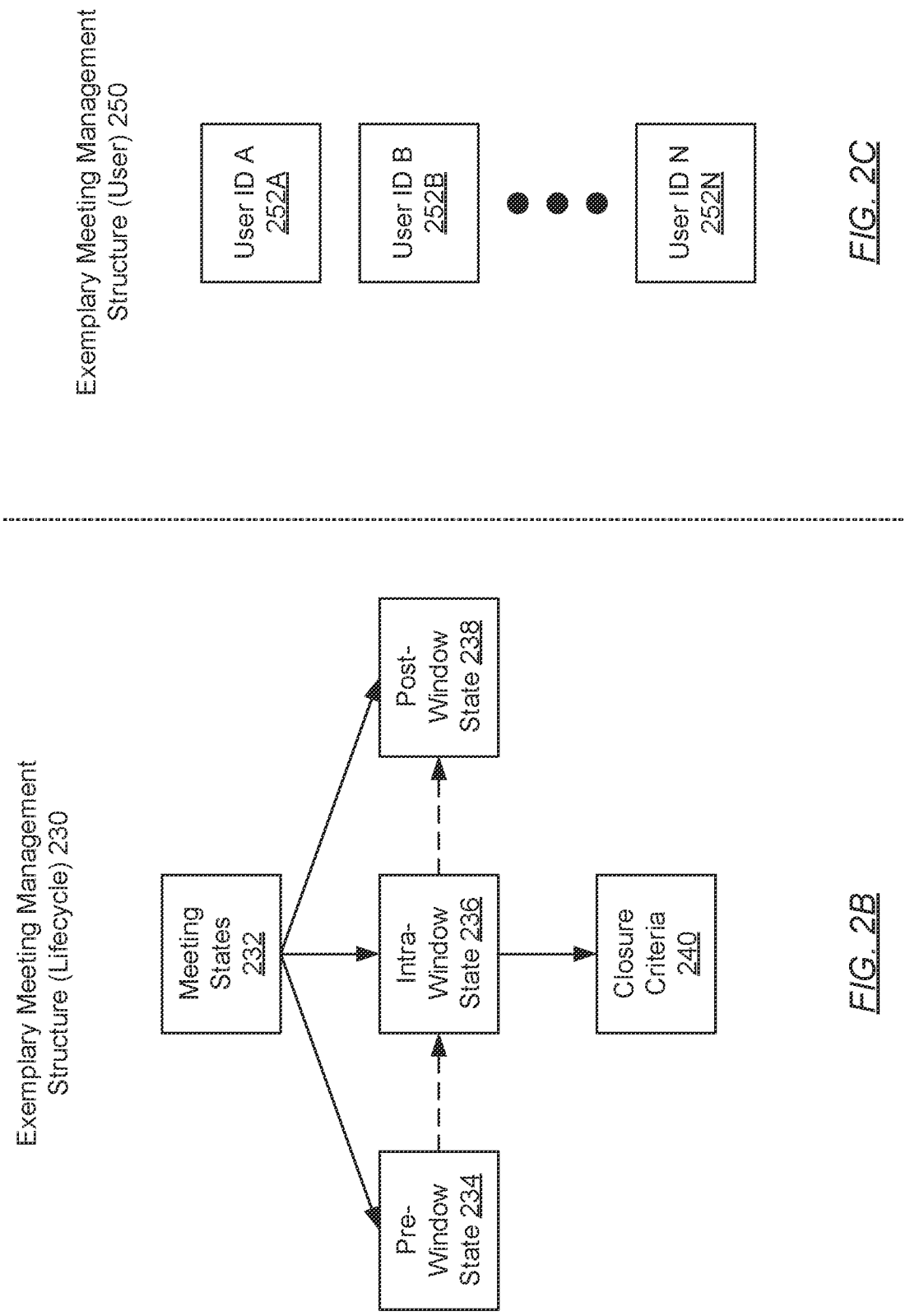

SESSION MANAGEMENT OF CONTENT DRIVEN MEETING SUMMARIES, ACTION ITEMS, MEETING CONTEXT CONTINUITY, AND SEGMENT AUDIO-VIDEO (AV) REPLAY FOR COLLABORATION SOLUTIONS

BACKGROUND

Throughout the modern age, computers and networking have facilitated countless processes. One such process is collaboration, implemented mainly using live (or synchronous) meetings. These live meetings, however, require all participants to attend, focus, and contribute at the same time.

SUMMARY

In general, in one aspect, the invention relates to a method for asynchronous meeting management. The method includes performing, by a collaboration platform service and upon meeting a window closure criterion for an asynchronous meeting, a non-iterative process, that includes aggregating, for a user and across a set of meeting sessions of the asynchronous meeting associated with the user, a set of session assets to obtain aggregated information, analyzing the aggregated information to produce meeting collateral, and submitting, to a target third-party collaboration tool service of a set of third-party collaboration tool services, a collateral-driven request including the meeting collateral.

In general, in one aspect, the invention relates to a method for asynchronous meeting management. The method includes performing, by a collaboration platform service and upon meeting a window closure criterion for an asynchronous meeting, a non-iterative process, that includes aggregating, for a user and across a set of meeting sessions of the asynchronous meeting associated with the user, a set of session assets to obtain aggregated information, analyzing the aggregated information to produce meeting collateral, obtaining a prospective meeting recommendation based on the meeting collateral, and submitting, to a target third-party collaboration tool service of a set of third-party collaboration tool services, a collateral-driven request including the prospective meeting recommendation.

In general, in one aspect, the invention relates to a method for asynchronous meeting management. The method includes performing, by a collaboration platform service and upon meeting a window closure criterion for an asynchronous meeting, a non-iterative process, that includes aggregating, for a user and across a set of meeting sessions of the asynchronous meeting associated with the user, a set of session assets to obtain aggregated information, producing a meeting audio-video (AV) recording from at least a portion of the aggregated information, and associating a meeting replay metadata object with the meeting AV recording to obtain a meeting replay record purposed for segment AV recording playback.

Other aspects of the invention will be apparent from the following description and the appended claims.

BRIEF DESCRIPTION OF DRAWINGS

FIG. 2B shows an exemplary meeting management structure in accordance with one or more embodiments of the invention.

FIG. 2C shows an exemplary meeting management structure in accordance with one or more embodiments of the invention.

DETAILED DESCRIPTION

Figure 1:
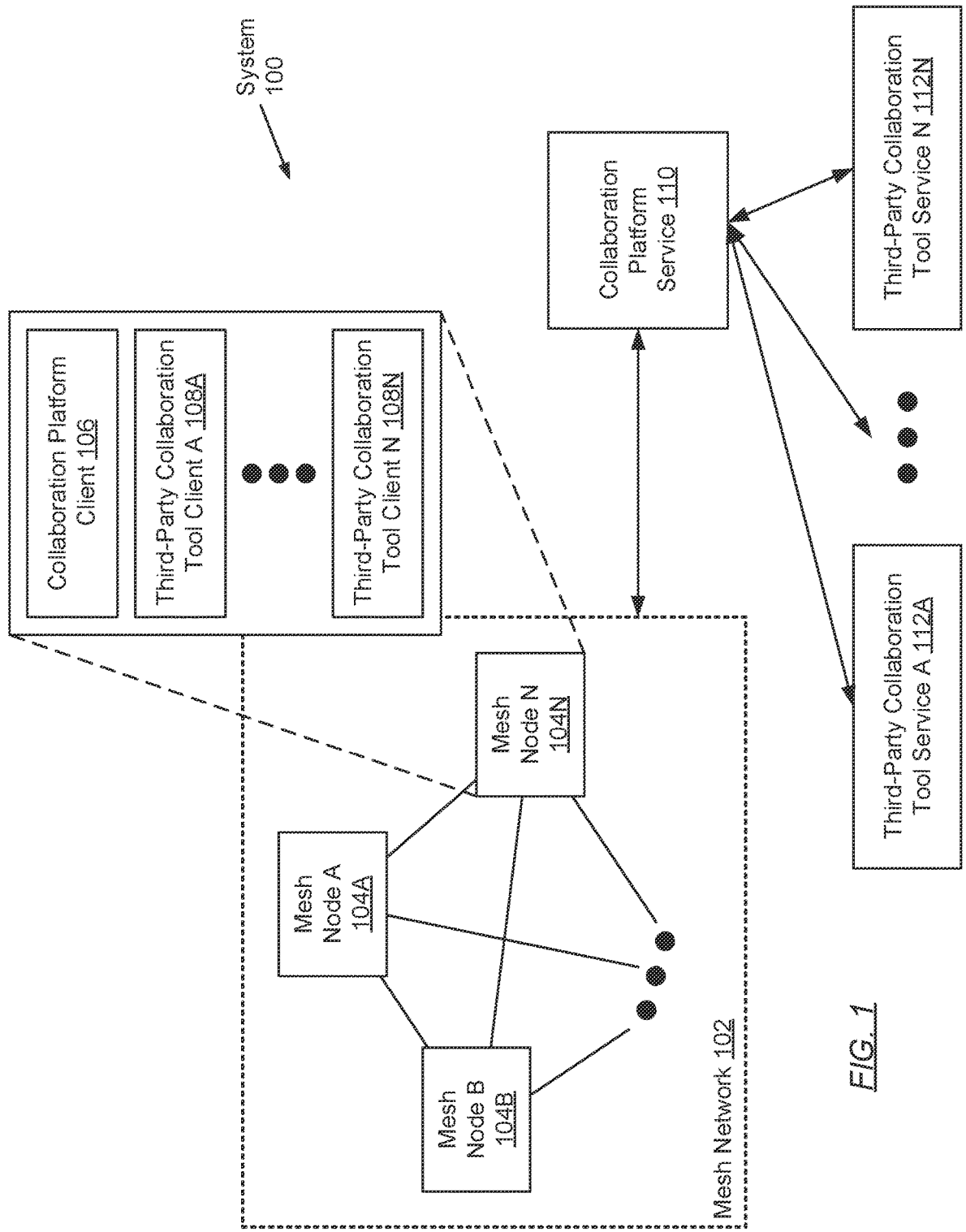
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-10, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method for the session management of content driven meeting summaries and action items in a commercial environment, which may be tied to multiple back-end cloud services. The method employs an association based data structure directed to improving the organization and persistence of post-meeting generated content or collateral (e.g., meeting summaries, notes, action items, etc.). Further, a method for learned meeting context continuity for past context and future meeting proposals tied to current meeting context. The method may match key topics, conversations, and attendees to deduce relation; and, accordingly, provide suitable next meeting predictions. Moreover, a method for intelligently managing segment audio-visual (AV) replay access, which may be indexed using users, topics, presenters, keywords, etc.

FIG. 1 shows a system in accordance with one or more embodiments of the invention. The system (100) may include two or more mesh nodes (104A-104N) operatively connected to a collaboration platform service (110), which in turn may operatively connect to one or more third-party collaboration tool services (112A-112N). Each of these system (100) components is described below.

In one embodiment of the invention, a mesh node (104A-104N) may represent any physical appliance or computing system configured to receive, generate, process, and/or transmit data, as well as to provide an environment in which at least a collaboration platform client (110) (described below) and one or more third-party collaboration tool clients (108A-108N) (described below) may operate thereon. In providing the aforementioned environment, a mesh node (104A-104N) may include and allocate various resources (e.g., computer processors, memory, storage, virtualization, networking, etc.), as needed, for at least the collaboration platform client (106) and one or more third-party collaboration tool clients (108A-108N) thereon to consume. One of ordinary skill will appreciate that a mesh node (104A-104N) may support other software and/or firmware, and may perform other functionalities without departing from the scope of the invention. Examples of a mesh node (104A-104N) may include, but are not limited to, a desktop computer, a laptop computer, a tablet computer, a smartphone, an intelligent or interactive display, a smart television, or any other computing system similar to the exemplary computing system shown in FIG. 10.

In one embodiment of the invention, each mesh node (104A-104N) may connect directly or indirectly (i.e., via a switch, a router, or any other network device (not shown)) to every other mesh node (104A-104N), thereby forming a mesh network (102). The mesh network (102) may therefore refer to a dynamic and non-hierarchical (or decentralized) network topology, where the mesh nodes (104A-104N) may include functionality to self-organize and self-configure. In this mesh network (102) formation, tasks and/or workloads may be distributed across the constituent mesh nodes (104A-104N).

In one embodiment of the invention, a collaboration platform client (106) may refer to software, firmware, or a combination thereof, which enables features and functionalities of a collaboration platform to execute or operate on the underlying hardware of any mesh node (104A-104N). The aforementioned collaboration platform may entail any service or tool (also referred to as groupware) that facilitates team or group collaboration—examples of which may include, but are not limited to, voice over Internet Protocol (VoIP) services, video-conferencing services, document sharing services, messaging services, email services, group calendar services, or any combination thereof. Further, each collaboration platform client (106) (respectively on each mesh node (104A-104N)) may include functionality to communicate, and thus exercise peer-to-peer (P2P) networking, with every other collaboration platform client (106) (respectively on every other mesh node (104A-104N)). Moreover, any collaboration platform client (106) may include additional functionality to communicate, or otherwise interact, with the collaboration platform service (108). One of ordinary skill will appreciate that any collaboration platform client (106) may perform other functionalities without departing from the scope of the invention.

In one embodiment of the invention, for any given asynchronous meeting (i.e., a virtual collaboration meeting between individuals that may transpire or may be conducted asynchronously (or not in real-time)), any collaboration platform client (106) (or one of the mesh nodes (104A-104N)), operated by a user or a set of users, may take on the role of a meeting participant. A meeting participant, subsequently, may refer to any entity whom partakes in any asynchronous meeting at the behest of one or more respective users. That is, any meeting participant may embody (or operate on) a private device—i.e., a physical computing device (e.g., desktop computer, laptop computer, tablet computer, smartphone, etc.) belonging to and operated by an individual (or a set of individuals). To that extent, any meeting participant may at least perform the methods outlined in FIGS. 4, 6A and 6B, and 8A and 8B, below, which are directed to the management of content driven meeting summaries and action items, meeting context continuity management, and segment audio-video (AV) replay management, respectively. One of ordinary skill will appreciate that any meeting participant may perform other functionalities without departing from the scope of the invention.

In one embodiment of the invention, a third-party collaboration tool client (108A-108N) may refer to non-proprietary software, firmware, or a combination thereof, which enables features and functionalities of a collaboration tool to execute or operate on the underlying hardware of any mesh node (104A-104N). The aforementioned collaboration tool may entail any service (also referred to as groupware) that facilitates team or group collaboration—examples of which may include, but are not limited to, voice over Internet Protocol (VoIP) services, video-conferencing services, document sharing services, messaging services, email services, group calendar services, task or project management services, or any combination thereof. Further, any collaboration tool client (108A-108N) (respectively on a mesh node (104A-104N)) and pertaining to a given collaboration tool may include functionality to communicate, or otherwise interact, with the third-party collaboration tool service (112A-112N) supporting the given collaboration tool. One of ordinary skill will appreciate that any collaboration tool client (108A-108N) may perform other functionalities without departing from the scope of the invention.

In one embodiment of the invention, the collaboration platform service (110) may represent information technology (IT) infrastructure configured for collaboration platform back-end support. To that extent, the collaboration platform service (110) may include functionality to at least perform the methods outlined in FIGS. 5A and 5B, 7A-7C, and 9A-9C, below, which are directed to the management of content driven meeting summaries and action items, meeting context continuity management, and segment audio-video (AV) replay management, respectively. To assist in the management of one or more asynchronous meeting sessions, one or more asynchronous meetings, and/or one or more meeting series (described below) (see e.g., FIG. 2A), the collaboration platform service (110) may also include functionality to maintain one or more meeting management structures (described below) (see e.g., FIGS. 2A-2E) and one or more meeting replay metadata objects (described below) (see e.g., FIG. 3B). One of ordinary will appreciate that the collaboration platform service (110) may perform other functionalities without departing from the scope of the invention. Furthermore, the collaboration platform service (110) may be implemented using one or more servers (not shown). Each server may represent a physical or virtual server, which may reside in a data center or cloud computing environment. Additionally, or alternatively, the collaboration platform service (110) may be implemented using one or more computing systems similar to the exemplary computing system shown in FIG. 10.

In one embodiment of the invention, a third-party collaboration tool service (112A-112N) may represent non-proprietary information technology (IT) infrastructure configured for third-party collaboration tool back-end support. To that extent, a collaboration tool service (112A-112N) may include functionality to at least process resource requests submitted by one or more associated third-party collaboration tool clients (108A-108N) (i.e., clients belonging to the shared collaboration tool). One of ordinary will appreciate that a third-party collaboration tool service (112A-112N) may perform other functionalities without departing from the scope of the invention. Furthermore, a third-party collaboration tool service (112A-112N) may be implemented using one or more servers (not shown). Each server may represent a physical or virtual server, which may reside in a data center or cloud computing environment. Additionally, or alternatively, a third-party collaboration tool service (112A-112N) may be implemented using one or more computing systems similar to the exemplary computing system shown in FIG. 10.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components, other system (100) configurations may be used without departing from the scope of the invention.

Figure 2A:
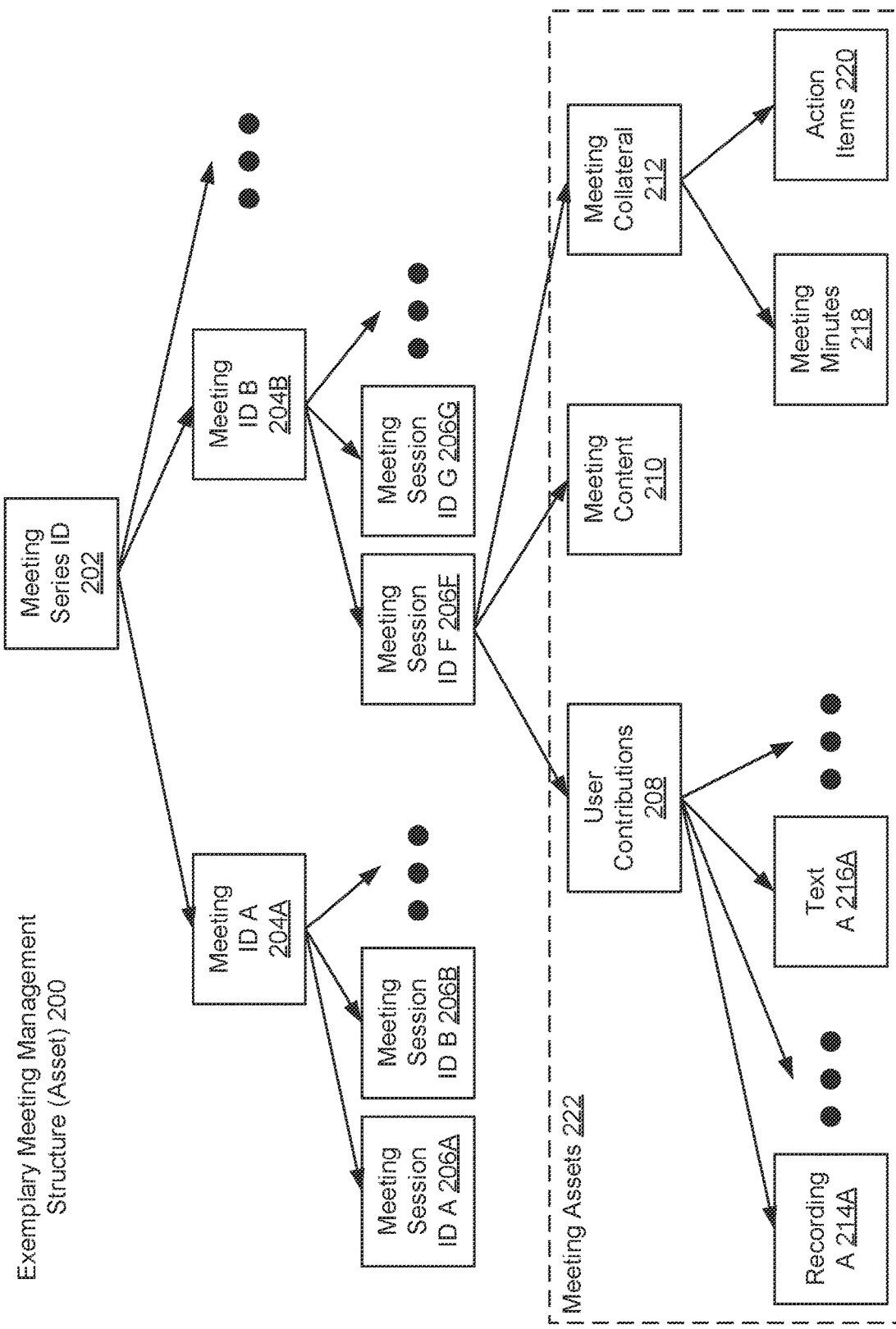
FIG. 2A shows an exemplary meeting management structure in accordance with one or more embodiments of the invention.

FIG. 2A shows an exemplary meeting management structure in accordance with one or more embodiments of the invention. Generally, a meeting management structure may refer to a data object or data structure employed to facilitate management (i.e., organization, consolidation, and access) of one or more aspects (or domains) of one or many asynchronous meeting(s) (or meeting series thereof). By way of an example, a possible configuration of a meeting management structure (200), purposed for meeting asset management, is illustrated in FIG. 2A and described below.

In one embodiment of the invention, a meeting asset (222) may represent any form or format of information, which may describe the collaborative discussion, topic, and/or focus of, or may be otherwise associated with, a given asynchronous meeting. The exemplary meeting management structure (200), accordingly, provides a scheme through which the aforementioned information, pertinent to one or more meeting sessions (206A, 206B, 206F, 206G), asynchronous meetings (204A, 204B) thereof, and/or a meeting series (202) thereof, may be stored and indexed to facilitate retrieval. A meeting series (202) may refer to a collection of related asynchronous meetings (204A, 204B), whereas a meeting session (206A, 206B, 206F, 206G) may refer to a portion or segment of a given asynchronous meeting (204A, 204B), which may be exclusively conducted by a single user while interfacing asynchronously (i.e., not in real-time) with other users (or attendees) of the given asynchronous meeting (204A, 204B).

Meeting assets (222) exemplified in the exemplary meeting management structure (200) include user contributions (208), meeting content (210), and meeting collateral (212). A user contribution (208) may encompass any authorized form of adjustment (or manipulation)—e.g., amendment, edit, deletion, correction, insertion, etc.—to meeting content (210) or other information co-created by any subset or all of the list of meeting attendees associated with the given asynchronous meeting, which may be reflective of the collaborative discussion, topic, or focus. The aforementioned adjustment may, for example, be implemented through video and/or audio recording(s) (214A), which capture user dialogue expressed during the given asynchronous meeting; and/or text-based user inputs (216A), such as comments, tags, questions, and other forms of electronic documentation that can be applied to or associated with the meeting content (210) (or other co-created information).

Furthermore, meeting content (210) may refer to one or more forms of information, which may facilitate the conveyance of the collaborative discussion, topic, and/or focus of the created asynchronous meeting. By way of examples, meeting content may include, but is not limited to, one or more electronic text documents, one or more electronic slide presentations, one or more electronic images, one or more animations, one or more videos, any other electronic multimedia, or any combination thereof.

Moreover, meeting collateral (212) may represent key meeting-relevant information generated following a window closure of an asynchronous meeting. Examples of meeting collateral may include, but are not limited to: meeting summaries or notes (also referred to as meeting minutes (218)) concisely describing events that had transpired during the asynchronous meeting, one or more action items (220) assigned to one or more meeting attendees following the asynchronous meeting, and consensus(es) reached amongst the meeting attendees during the asynchronous meeting.

FIG. 2B shows an exemplary meeting management structure in accordance with one or more embodiments of the invention. Generally, a meeting management structure may refer to a data object or data structure employed to facilitate management (i.e., organization, consolidation, and access) of one or more aspects (or domains) of one or many asynchronous meeting(s) (or meeting series thereof). By way of an example, a possible configuration of a meeting management structure (230), purposed for meeting lifecycle management, is illustrated in FIG. 2B and described below.

In one embodiment of the invention, a meeting lifecycle may reference a series of stages or states (232), in functional activity, through which any given asynchronous meeting transpires or may be conducted. The exemplary meeting management structure (230), accordingly, provides a scheme through which the aforementioned series of stages/states (232) may be followed, and actions or information pertinent to each stage/state (232) may be recorded.

Meeting stages (or states) (232) exemplified in the exemplary meeting management structure (230) include a pre-window state (234), an intra-window state (236), and a post-window state (238). The pre-window state (234) entails respective actions, performed by any meeting participant or the collaboration platform service, prior to a window activation timestamp configured for a given asynchronous meeting. Further, the intra-window state (236) entails respective actions, performed by any meeting participant or the collaboration platform service, during or between the window action timestamp and the meeting of window closure criterion/criteria configured for the given asynchronous meeting. Moreover, the post-window state (238) entails respective actions, performed by any meeting participant or the collaboration platform service, upon or after the window closure criterion/criteria has/have been met.

In one embodiment of the invention, the window activation timestamp may reference a prospective date and/or time at which the given asynchronous meeting is set to commence, whereas the window closure criterion/criteria may describe one or more conditions or rules, which may mark a termination of the asynchronous meeting. By way of an example, the window closure criterion/criteria may be time-based—e.g., may indicate a window termination timestamp (or a specified time period following the window activation timestamp) at which the given asynchronous meeting may be set to end. By way of another example, the window closure criterion/criteria may be contribution-based—e.g., may specify the number of rounds (or cycles) of user contribution(s) (described below), from each meeting participant, which should be applied throughout the given asynchronous meeting. Other window closure criterion/criteria may be employed without departing from the scope of the invention.

Concerning the intra-window state (236), by way of an example, actions and/or information pertinent to the aforementioned state may include, but are not limited to, the window closure criterion/criteria (240) (described above) used to define the circumstances in which the aforementioned state terminates.

FIG. 2C shows an exemplary meeting management structure in accordance with one or more embodiments of the invention. Generally, a meeting management structure may refer to a data object or data structure employed to facilitate management (i.e., organization, consolidation, and access) of one or more aspects (or domains) of one or many asynchronous meeting(s) (or meeting series thereof). By way of an example, a possible configuration of a meeting management structure (250), purposed for meeting participant or user management, is illustrated in FIG. 2C and described below.

In one embodiment of the invention, a meeting participant or user may refer to an individual (or individuals) operating a mesh node (described above) (see e.g., FIG. 1) representative of, or host to, a meeting participant. The exemplary meeting management structure (250), accordingly, provides a scheme through which various users or attendees (252A-252N), which may have participated in one or more asynchronous meetings, may be recorded and indexed.

Figure 2D:
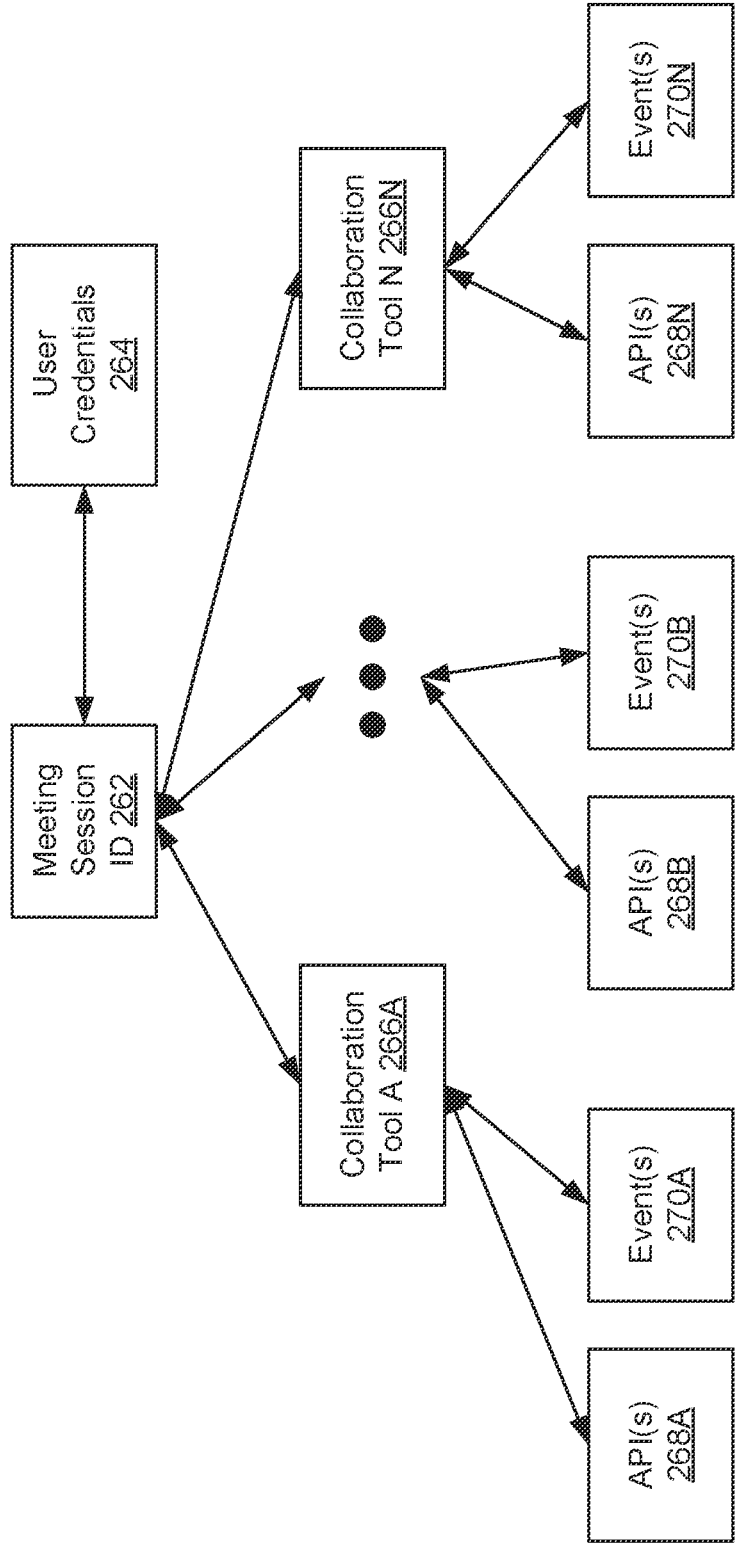
FIG. 2D shows an exemplary meeting management structure in accordance with one or more embodiments of the invention.

FIG. 2D shows an exemplary meeting management structure in accordance with one or more embodiments of the invention. Generally, a meeting management structure may refer to a data object or data structure employed to facilitate management (i.e., organization, consolidation, and access) of one or more aspects (or domains) of one or more asynchronous meeting(s) (or meeting sessions and/or meeting series thereof). By way of an example, a possible configuration of a meeting management structure (260), purposed for user-associated third-party collaboration tool management, is illustrated in FIG. 2D and described below.

In one embodiment of the invention, a third-party collaboration tool (266A-266N) may represent any non-proprietary service (also referred to as groupware) that facilitates team or group collaboration. A third-party collaboration tool (266A-266N) may be employed, by any given collaborator (or user), to engage in collaboration relevant activities—e.g., video conferencing, content co-creation, etc. The exemplary meeting management structure (260), thus, provides a scheme through which said collaboration relevant activities, performed by a given user while employing a set of third-party collaboration tools (266A-266N), may be logged and indexed for a given meeting session (described above) (see e.g., FIG. 2A).

In one embodiment of the invention, a given user may hold a license (or account), possibly associated with user credentials (264), for accessing and/or using the collaborative features and functionalities offered by one or more third-party collaboration tools (266A-266N). These user credentials (264) may serve to authenticate the given user with one or more third-party collaboration tools (266A-266N). Further, the user credentials (264) may include, for example, a different user name and password authentication token for each third-party collaboration tool (266A-266N) employed by the user. Alternatively, the user credentials may include a single sign-on (or shared) user name and password authentication token that may be used across any subset or all of the third-party collaboration tools (266A-266N) employed by the user.

Moreover, to log the above-mentioned collaboration relevant activities, performed by the given user while interacting with the set of third-party collaboration tools (266A-266N), event information (270A, 270B, 270N) descriptive of the collaboration relevant activities, as they pertain to each third-party collaboration tool (266A-266N), may be maintained in the exemplary meeting management structure (260). In addition, details concerning the access and interaction protocol associated with application programming interfaces (APIs) (268A, 268B, 268N) for each of the user-employed set of third-party collaboration tools (266A-266N) may also be maintained.

Figure 2E:
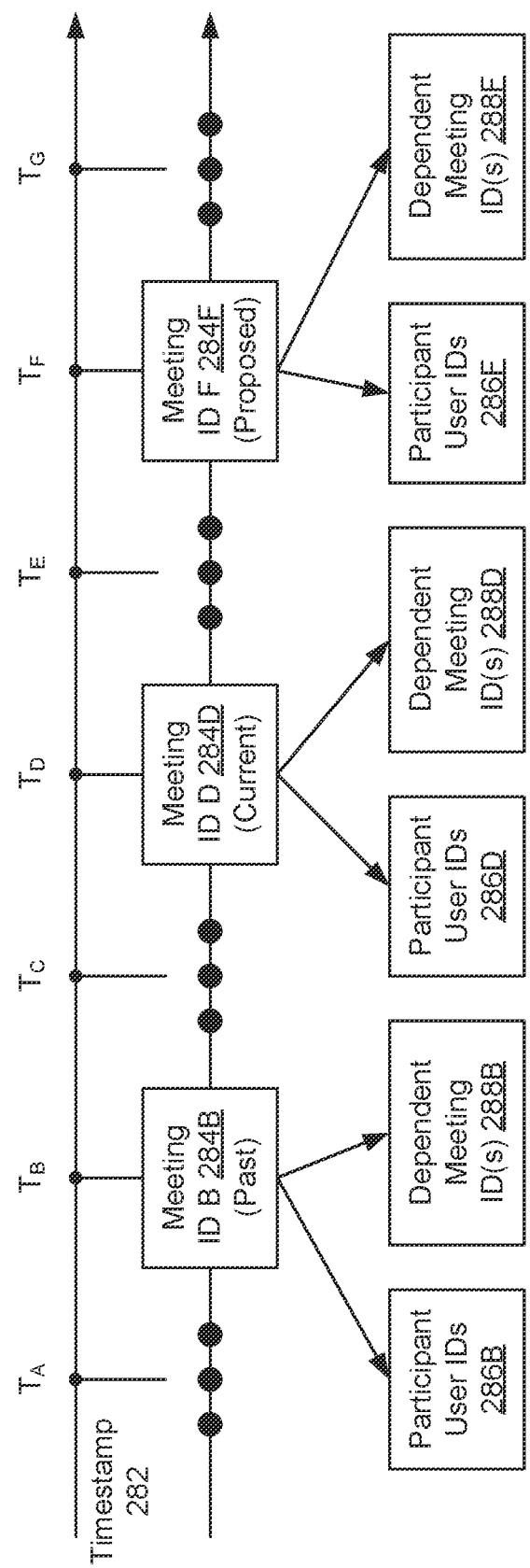
FIG. 2E shows an exemplary meeting management structure in accordance with one or more embodiments of the invention.

FIG. 2E shows an exemplary meeting management structure in accordance with one or more embodiments of the invention. Generally, a meeting management structure may refer to a data object or data structure employed to facilitate management (i.e., organization, consolidation, and access)

of one or more aspects (or domains) of one or more asynchronous meeting(s) (or meeting sessions and/or meeting series thereof). By way of an example, a possible configuration of a meeting management structure (280), purposed for meeting scheduling or planning, is illustrated in FIG. 2E and described below.

In one embodiment of the invention, the exemplary meeting management structure (280) may integrate time-based elements—e.g., a timeline reflecting a set of timestamps (282) positioned in chronological order—with metadata pertinent to the scheduling of asynchronous meetings (284B, 284D, 284F). The aforementioned metadata exemplified in the exemplary meeting management structure (280), for each asynchronous meeting (284B, 284D, 284F), includes a list of attendee or user IDs (286B, 286D, 286F) and a set (if any) of dependent meeting IDs (288B, 288D, 288F).

Each attendee/user ID, specified in the list of attendee/user IDs (286B, 286D, 286F) for a given asynchronous meeting (284B, 284D, 284F), may pertain to an invited attendee/user (or prospective attendee/user) of the given asynchronous meeting (284B, 284D, 284F). Further, each dependent meeting ID (if any), specified in the set of dependent meeting IDs (288B, 288D, 288F) for a given asynchronous meeting (284B, 284D, 284F), may reflect a meeting dependency (described below) associated with the given asynchronous meeting (284B, 284D, 284F).

In one embodiment of the invention, a meeting dependency may identify another asynchronous meeting, past, current, or future, which should be conducted chronological prior to the given asynchronous meeting (284B, 284D, 284F)—i.e., in chronological alignment of tasks, workloads, etc. associated with the collaborative discussion, topic, or focus of the asynchronous meeting series. For example, the given asynchronous meeting (284B, 284D, 284F), which may be directed to the manufacturing of a widget, should be scheduled following another given asynchronous meeting (284B, 284D, 284F) that may be directed to the designing of the widget, as a designing phase is often understood to precede a manufacturing phase.

While FIGS. 2A-2E each show a configuration of components representative of a meeting management structure, one of ordinary skill will appreciate that other meeting management structure (200, 230, 250, 260, 280) configurations—directed to asset, lifecycle, user, tool, or meeting aspects of one or more asynchronous meetings—may be used without departing from the scope of the invention. Further, one of ordinary skill will appreciate that asynchronous meeting management may entail additional or alternative meeting management structures, which may be directed to other asynchronous meeting aspects (or domains).

Figure 3A:
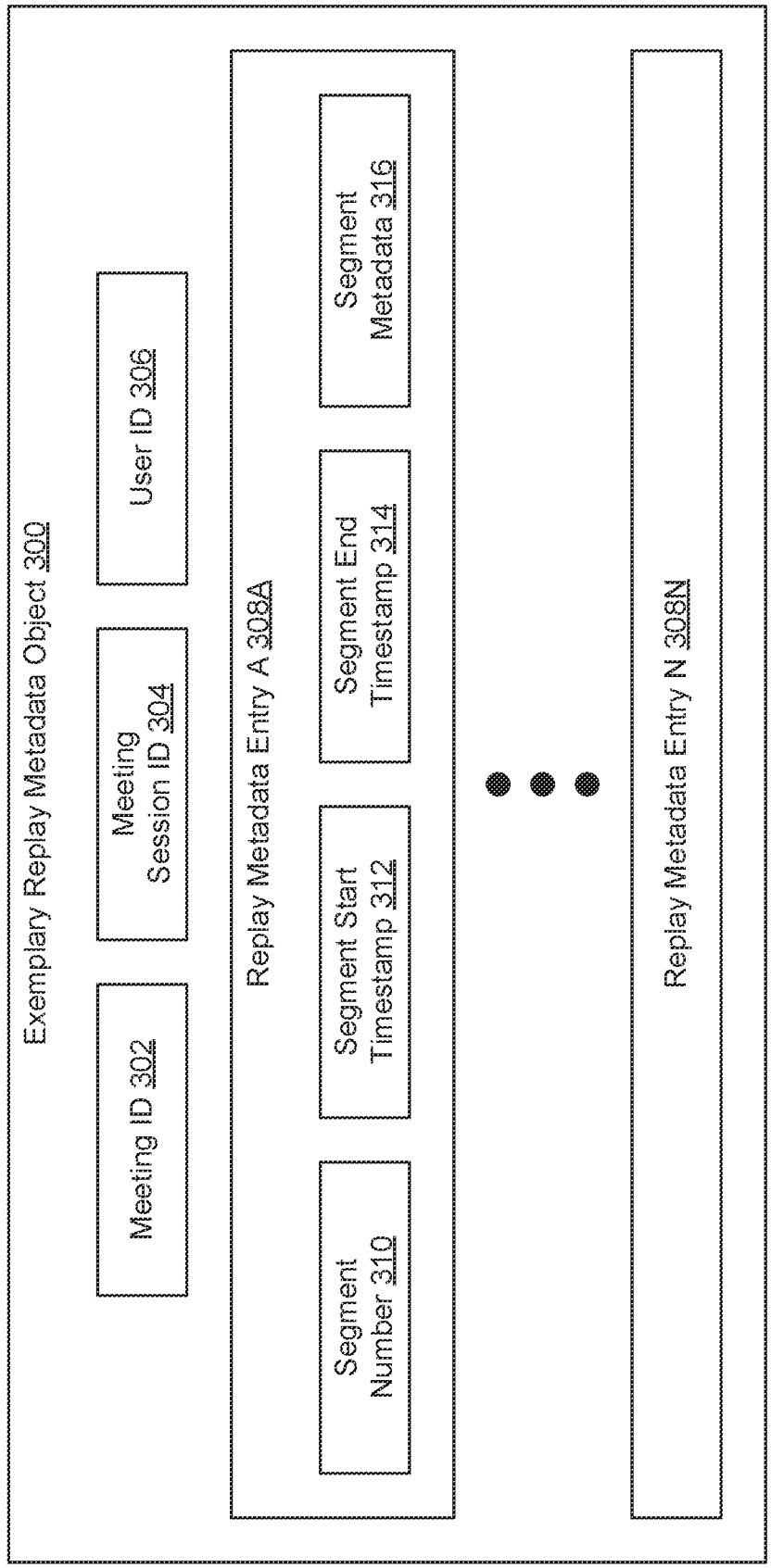
FIG. 3A shows an exemplary replay metadata object in accordance with one or more embodiments of the invention.

FIG. 3A shows an exemplary replay metadata object in accordance with one or more embodiments of the invention. The exemplary replay metadata object (300) may refer to a data object (e.g., an electronic file) or a data structure employed, by any meeting participant (described above) (see e.g., FIG. 1), to log metadata descriptive of a given meeting session (described above) (see e.g., FIG. 2A) conducted by a given user for a given asynchronous meeting. To that extent, the exemplary replay metadata object (300) may include, but is not limited to, a meeting identifier (ID) (302), a meeting session ID (304), a user ID (306), and one or more replay metadata entries (308A-308N). Each of these exemplary replay metadata object (300) subcomponents is described below.

In one embodiment of the invention, the meeting ID (302) refers to an arbitrary collection of characters (e.g., letters, numbers, symbols, etc.) associated with (and used to uniquely identify) the given asynchronous meeting. The meeting session ID (304), subsequently, refers to another arbitrary collection of characters associated with (and used to uniquely identify) the given meeting session. Meanwhile, the user ID (306) refers to yet another arbitrary collection of characters associated with (and used to uniquely identify) the given user.

Furthermore, in one embodiment of the invention, each replay metadata entry (308A-308N) refers to a collection of information, which describes a given active user interaction performed, by the given user, during a duration of the given meeting session. An active user interaction may refer to an asynchronous meeting relevant action or activity. By way of an example, the act of speaking or presenting, as they may be performed by the given user while engaging in meeting content co-creation, commenting, questioning, etc., may exemplify an active user interaction. The aforementioned collection of information, specified in each replay metadata entry (308A-308N), may include, but is not limited to, a segment number (310), a segment start timestamp (312), a segment end timestamp (314), and segment metadata (316).

In one embodiment of the invention, the segment number (310) may reflect an identifier or index assigned to the given replay metadata entry (308A-308N). The segment start timestamp (312) may reflect a date and/or time when the given user started the given active user interaction. Further, the segment end timestamp (314) may reflect a date and/or time when the given user ceased the given active user interaction. Lastly, the segment metadata (316) may reflect text that describes the given active user interaction. The segment metadata (316) may be as detailed as conveying a context of the given active user interaction. For example, for an active user interaction involving the act of speaking or presenting, the segment metadata (316) may be populated with context that indicates the subject matter of the dialogue, or the class of dialogue (e.g., providing a comment, posing a question, describing content, etc.) associated with the given active user interaction.

While FIG. 3A shows a configuration of components, other replay metadata object (300) configurations may be used without departing from the scope of the invention.

Figure 3B:
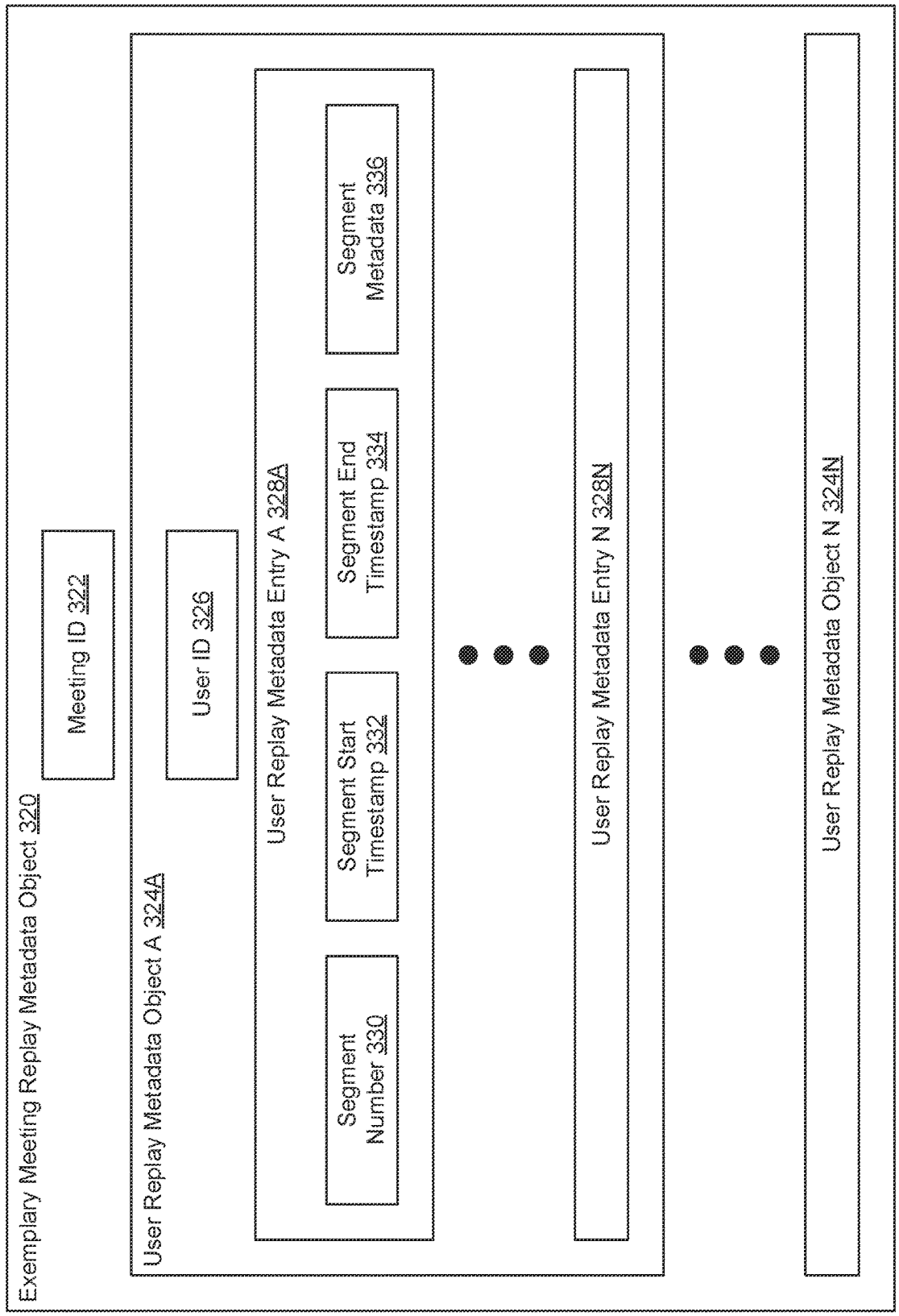
FIG. 3B shows an exemplary meeting replay metadata object in accordance with one or more embodiments of the invention.

FIG. 3B shows an exemplary meeting replay metadata object in accordance with one or more embodiments of the invention. The exemplary meeting replay metadata object (320) may refer to a data object (e.g., an electronic file) or a data structure employed, by the collaboration platform service, to aggregate metadata descriptive of a given asynchronous meeting involving a given set of users (or attendees). To that extent, the exemplary meeting replay metadata object (320) may include, but is not limited to, a meeting identifier (ID) (322) and one or more user replay metadata objects (324A-324N). Each of these exemplary meeting repay metadata object (320) subcomponents is described below.

In one embodiment of the invention, the meeting ID (322) refers to an arbitrary collection of characters (e.g., letters, numbers, symbols, etc.) associated with (and used to uniquely identify) the given asynchronous meeting. Each user replay metadata object (324A-324N), on the other hand, may refer to a data structure that maintains information pertinent to a given set of meeting sessions, conducted by a given user (of the given set of users), throughout the given asynchronous meeting. Accordingly, each user replay metadata object (324A-324N) may specify, but is not limited to, a user ID (326) and one or more user replay metadata entries (328A-328N), which are described below.

In one embodiment of the invention, the user ID (326) refers to an arbitrary collection of characters (e.g., letters, numbers, symbols, etc.) associated with (and used to uniquely identify) the above-mentioned given user. Meanwhile, each user replay metadata entry (328A-328N) refers to a collection of information, which describes a given active user interaction performed, by the given user, during a duration of a given meeting session. An active user interaction may refer to an asynchronous meeting relevant action or activity. By way of an example, the act of speaking or presenting, as they may be performed by the given user while engaging in meeting content co-creation, commenting, questioning, etc., may exemplify an active user interaction. The aforementioned collection of information, specified in each user replay metadata entry (328A-328N), may include, but is not limited to, a segment number (330), a segment start timestamp (332), a segment end timestamp (334), and segment metadata (336), which are further described below.

In one embodiment of the invention, the segment number (330) may reflect an identifier or index assigned to the given user replay metadata entry (328A-328N). The segment start timestamp (332) may reflect a date and/or time when the given user started the given active user interaction. Further, the segment end timestamp (334) may reflect a date and/or time when the given user ceased the given active user interaction. Lastly, the segment metadata (336) may reflect text that describes the given active user interaction. The segment metadata (336) may be as detailed as conveying a context of the given active user interaction. For example, for an active user interaction involving the act of speaking or presenting, the segment metadata (336) may be populated with context that indicates the subject matter of the dialogue, or the class of dialogue (e.g., providing a comment, posing a question, describing content, etc.) associated with the given active user interaction.

While FIG. 3B shows a configuration of components, other meeting replay metadata object (320) configurations may be used without departing from the scope of the invention.

Figure 4:
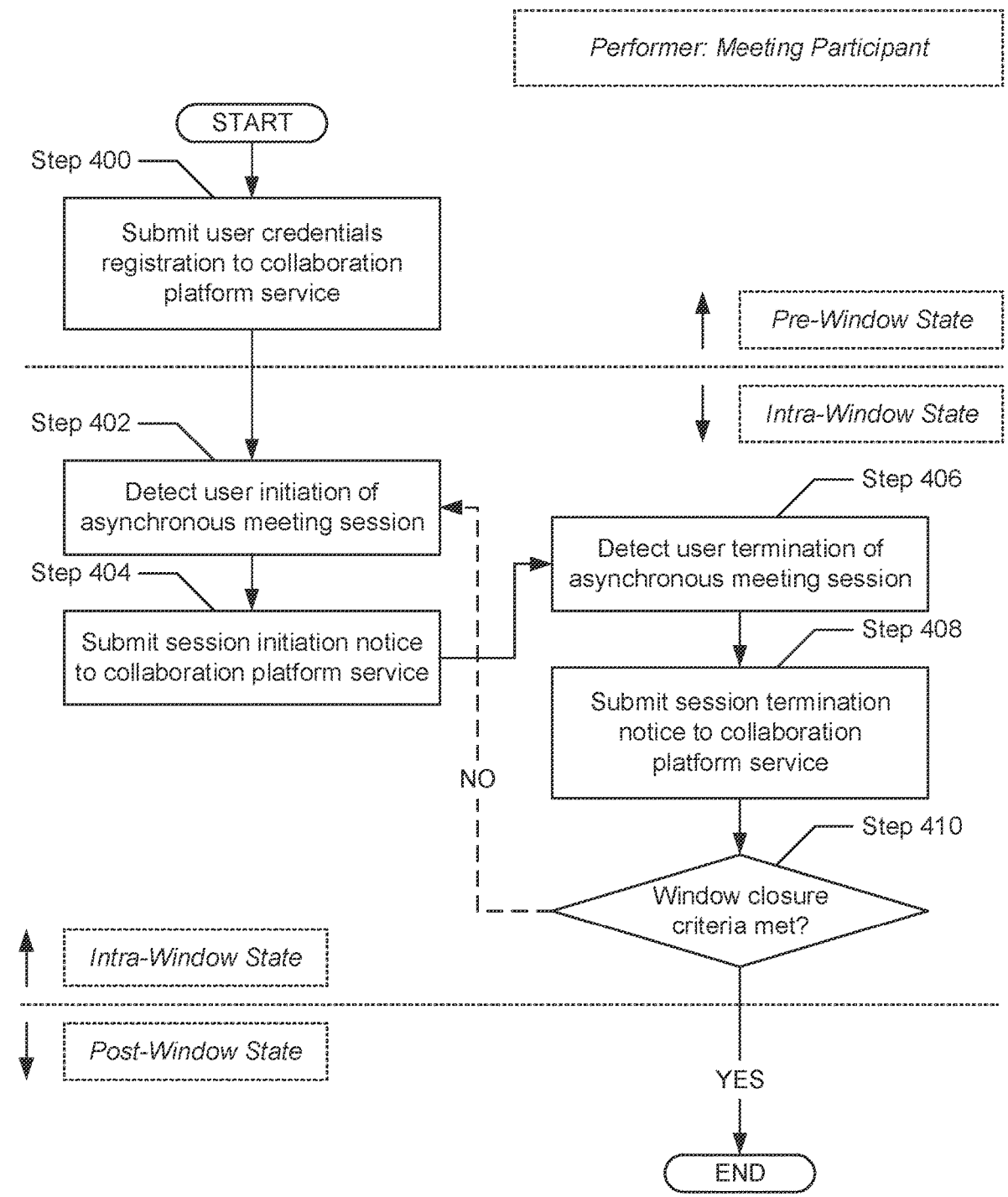
FIG. 4 shows a flowchart describing a method for the management of content driven meeting summaries and action items in accordance with one or more embodiments of the invention.

FIG. 4 shows a flowchart describing a method for the management of content driven meeting summaries and action items in accordance with one or more embodiments of the invention. The various steps outlined below may be performed by any meeting participant (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a user credentials registration is submitted to the collaboration platform service (see e.g., FIG. 1). In one embodiment of the invention, the user credentials registration may include user credentials necessary to authenticate a user of the meeting participant (or a respective account thereof) associated with one or more third-party collaboration tools. The user credentials, specified in the user credentials registration, may include, for example, a different user name and password authentication token for each third-party collaboration tool employed by the user of the meeting participant. Alternatively, the user credentials, specified in the user credentials registration, may include a single sign-on (or shared) user name and password authentication token that may be used across any subset or all of the third-party collaboration tools employed by the user of the meeting participant.

In Step 402, a user initiation of an asynchronous meeting session (also referred to simply as a meeting session) is detected. In one embodiment of the invention, a meeting session may refer to a portion or segment of a given asynchronous meeting, which may be exclusively conducted by a single user (e.g., the user of the meeting participant) while interfacing asynchronously (i.e., not in real-time) with other users (or attendees) of the given asynchronous meeting. Further, initiation of the meeting session, by the user, may entail, for example, their active interaction with the asynchronous meeting within the collaboration platform client operating on their respective mesh node or computing device.

In one embodiment of the invention, an asynchronous meeting may refer to a virtual collaboration setting, amongst local (i.e., co-located) and/or remote (i.e., physically distant) collaborators, which may transpire or may be conducted asynchronously (i.e., not in real-time). Further, any asynchronous meeting may be defined through a set of configuration parameters, which may be selected by an organizing attendee (i.e., a meeting organizer), or generated by the meeting participant thereof. Examples of the aforementioned configuration parameters may include, but are not limited to: a list of meeting attendees (i.e., users of two or more meeting participants); a meeting identifier (ID) assigned to the asynchronous meeting; a meeting series ID assigned to an asynchronous meeting series (or a collection of related asynchronous meetings) with which the asynchronous meeting may be associated; a window activation timestamp referencing a prospective date and/or time at which the asynchronous meeting is set to commence; and a window closure criterion (or criteria) describing one or more conditions or rules, which may mark a termination of the asynchronous meeting.

In one embodiment of the invention, the above-mentioned window (or meeting window) of an asynchronous meeting may reference an elapsed time (i.e., a span of time or difference between a specified beginning time and a specified ending time) of the asynchronous meeting, wherein any non-real-time user contributions and/or meeting content (described above) (see e.g., FIG. 2A), by/from the any meeting attendee within the list of meeting attendees, are permitted.

In Step 404, in response to the user initiation of a meeting session (detected in Step 402), a session initiation notice is submitted to the collaboration platform service. In Step 406, a user termination of the meeting session (for which an initiation by the user had been detected in Step 402) is subsequently detected. In one embodiment of the invention, termination of the meeting session, by the user, may entail, for example, their inactivity with the asynchronous meeting, for a predefined period of time, within the collaboration platform client operating on their respective mesh node or computing device. Further, between the user initiation and user termination of the meeting session, the user of the meeting participant may engage in one or more activities pertinent to the asynchronous meeting—examples of which may include, but are not limited to: the co-creation of meeting content associated with the asynchronous meeting; and the furnishing of one or more user contributions (described above) (see e.g. FIG. 2A) pertinent to the asynchronous meeting.

In Step 408, in response to the user termination of a meeting session (detected in Step 406), a session termination notice is submitted to the collaboration platform service. Thereafter, in Step 410, a determination is made as to whether the window closure criterion or criteria, for the asynchronous meeting, has been met. By way of an example, the window closure criterion/criteria may be time-based—e.g., may indicate a window termination timestamp (or a specified time period following the window activation timestamp) at which the asynchronous meeting may be set to end. By way of another example, the window closure criterion/criteria may be contribution-based—e.g., may specify the number of rounds (or cycles) of user contribution(s) and/or meeting content co-creation, from each of any subset or all meeting attendees, which should be applied throughout the asynchronous meeting. Other window closure criterion/criteria may be employed without departing from the scope of the invention.

Accordingly, in one embodiment of the invention, if it is determined that the window closure criterion/criteria, for the asynchronous meeting, has been met, then the process ends. On the other hand, in another embodiment of the invention, if it is alternatively determined that the window closure criterion/criteria has not been met, then the process alternatively proceeds to Step 402, where the user initiation of another meeting session is detected.

Figure 5A:
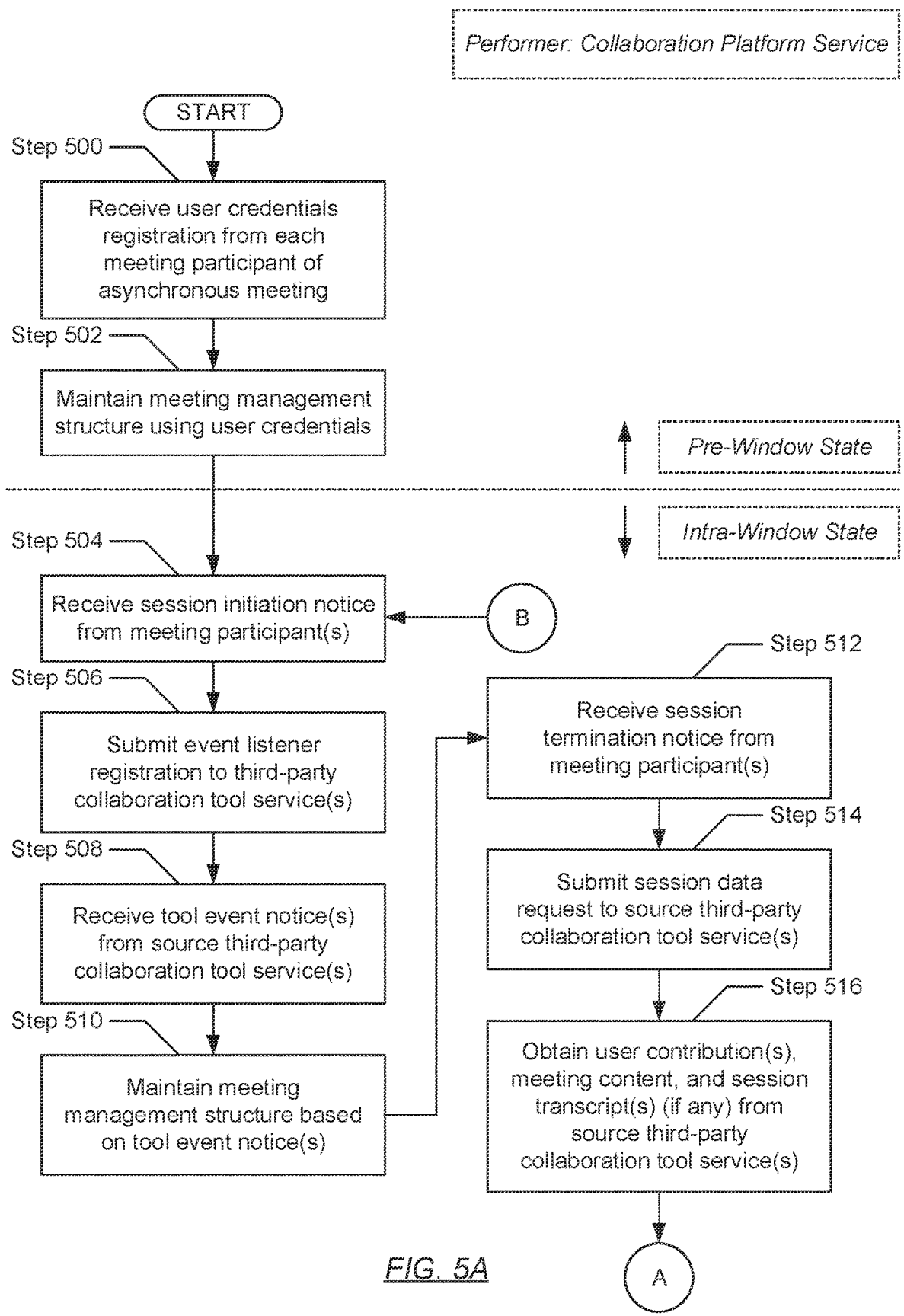
FIGS. 5A and 5B show flowcharts describing a method for the management of content driven meeting summaries and action items in accordance with one or more embodiments of the invention.
Figure 5B:
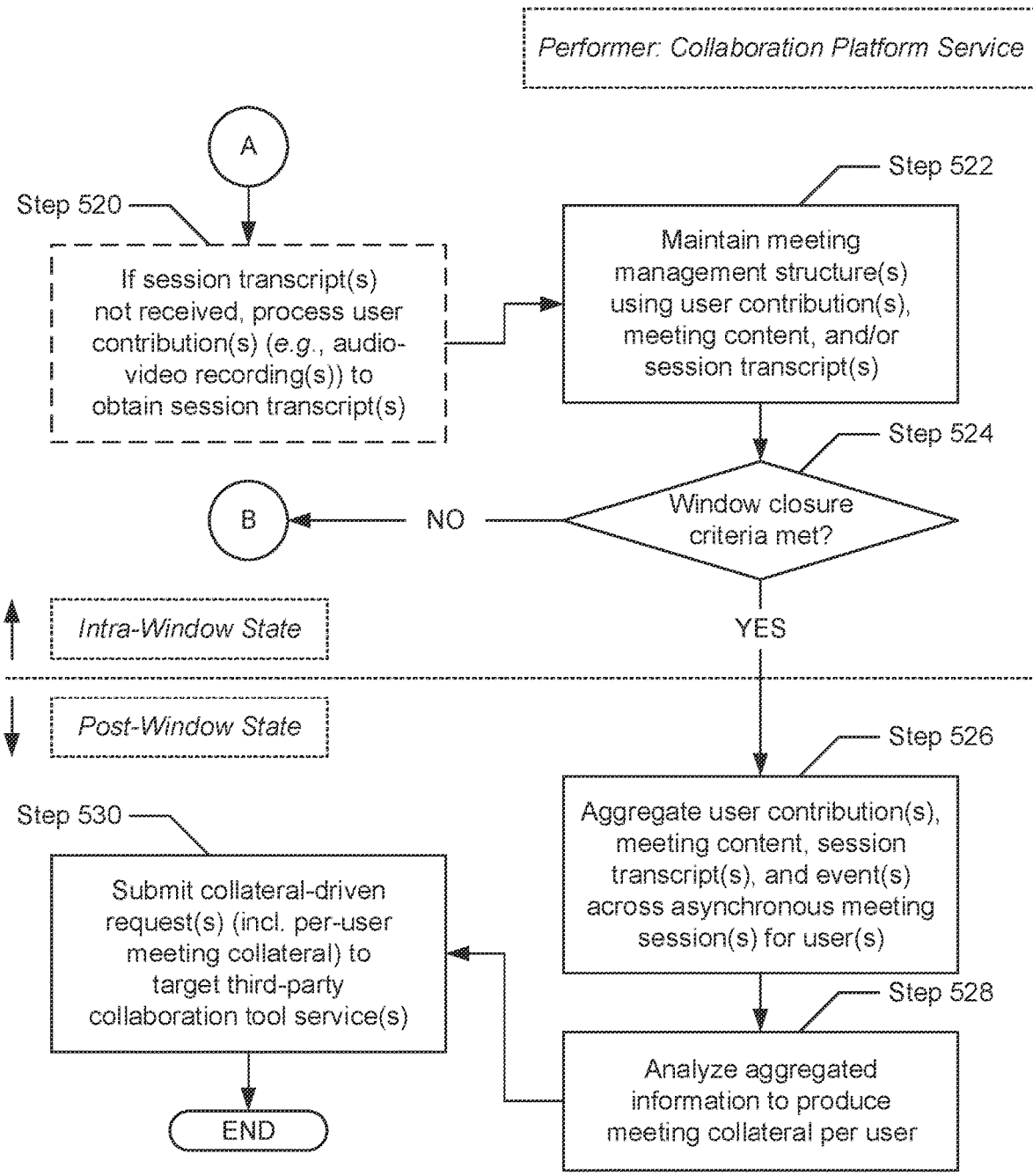

FIGS. 5A and 5B show flowcharts describing a method for the management of content driven meeting summaries and action items in accordance with one or more embodiments of the invention. The various steps outlined below may be performed by the collaboration platform service (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, a user credentials registration is received from each meeting participant (described above) (see e.g., FIG. 1) associated with an asynchronous meeting. Generally, in one embodiment of the invention, an asynchronous meeting may refer to a virtual collaboration setting, amongst local (i.e., co-located) and/or remote (i.e., physically distant) collaborators, which may transpire or may be conducted asynchronously (i.e., not in real-time). Further, any asynchronous meeting may be defined through a set of configuration parameters, which may be selected by an organizing attendee (i.e., a meeting organizer), or generated by the meeting participant thereof. Examples of the aforementioned configuration parameters may include, but are not limited to: a list of meeting attendees (i.e., users of two or more meeting participants); a meeting identifier (ID) assigned to the asynchronous meeting; a meeting series ID assigned to an asynchronous meeting series (or a collection of related asynchronous meetings) with which the asynchronous meeting may be associated; a window activation timestamp referencing a prospective date and/or time at which the asynchronous meeting is set to commence; and a window closure criterion (or criteria) describing one or more conditions or rules, which may mark a termination of the asynchronous meeting.

In one embodiment of the invention, the above-mentioned window (or meeting window) of an asynchronous meeting may reference an elapsed time (i.e., a span of time or difference between a specified beginning time and a specified ending time) of the asynchronous meeting, wherein any non-real-time user contributions and/or meeting content (described above) (see e.g., FIG. 2A), by/from the any meeting attendee within the list of meeting attendees, are permitted.

Furthermore, in one embodiment of the invention, the above-mentioned user credentials registration, from a given meeting participant, may include user credentials necessary to authenticate a user of the given meeting participant (or a respective account thereof) associated with one or more third-party collaboration tools. The user credentials, specified in the user credentials registration, may include, for example, a different user name and password authentication token for each third-party collaboration tool employed by the user of the given meeting participant. Alternatively, the user credentials, specified in the user credentials registration, may include a single sign-on (or shared) user name and password authentication token that may be used across any subset or all of the third-party collaboration tools employed by the user of the given meeting participant.

In Step 502, a meeting management structure, instantiated for each meeting participant (or rather, the respective user thereof), is maintained (or updated) using the user credentials for the respective user (received in Step 500). Specifically, in one embodiment of the invention, any meeting management structure(s) purposed for user-associated third-party collaboration tool management (see e.g., FIG. 2D) may be maintained.

In Step 504, a session initiation notice is received from one or more meeting participants associated with the asynchronous meeting. In one embodiment of the invention, a session initiation notice may inform the collaboration platform service that a user for a given meeting participant has initiated a meeting session associated with the asynchronous meeting. A meeting session may refer to a portion or segment of the asynchronous meeting, which may be exclusively conducted by a single user (e.g., the user of the given meeting participant) while interfacing asynchronously (i.e., not in real-time) with other users (or attendees) of the asynchronous meeting.

In Step 506, in response to receiving the session initiation notice from a given meeting participant (in Step 504), an event listener registration is subsequently submitted to one or more third-party collaboration tool services (see e.g., FIG. 1). In one embodiment of the invention, the event listener registration may include the user credentials (received in Step 500) for the user of the given meeting participant. Further, the event listener registration may reflect a request to receive, or be notified of, any events logging interactions, by the user, while using a third-party collaboration tool client associated with the third-party collaboration tool service(s).

In Step 508, one or more tool event notices is/are received from one or more source third-party collaboration tool services. In one embodiment of the invention, a tool event notice may refer to a notification informing of the occurrence of a user-driven interactive event within the environment of a third-party collaboration tool client. Any given tool event notice, accordingly, may pertain to the user of a given meeting participant. Examples of a user-driven interactive event may include, but are not limited to: comments contributed by the given meeting participant; tasks completed by the given meeting participant; and the receipt of co-created content by the given meeting participant.

In Step 510, a meeting management structure, instantiated for one or more meeting participants (or rather, the respective user(s) thereof), is maintained (or updated) using the tool event notice(s) for the respective user(s) (received in Step 508). Specifically, in one embodiment of the invention, any meeting management structure(s) purposed for user-associated third-party collaboration tool management (see e.g., FIG. 2D) may be maintained.

In Step 512, a session termination notice is received from one or more meeting participants associated with the asynchronous meeting. In one embodiment of the invention, a session termination notice may inform the collaboration platform service that a user for a given meeting participant has terminated a meeting session (related to the session initiation notice received in Step 504) associated with the asynchronous meeting.

In Step 514, in response to receiving the session termination notice from a given meeting participant (in Step 512), a session data request is submitted to each of the source third-party collaboration tool service(s) (from which at least one tool event notice had been received in Step 508). In one embodiment of the invention, the session data request may query a given source third-party collaboration tool service for any works and/or information capturing the interaction(s), conducted by the user of the given meeting participant, while using the third-party collaboration tool client, associated with the given source third-party collaboration tool service, throughout their meeting session (for which the session termination notice had been received in Step 512).

In Step 516, in response to the session data request (submitted in Step 514) to a given source third-party collaboration tool service, a set of user contributions, co-created meeting content, and/or a session transcript (if available) is/are received from the given source third-party collaboration tool service. In one embodiment of the invention, a user contribution may encompass any authorized form of adjustment (or manipulation)—e.g., amendment, edit, deletion, correction, insertion, etc.—to co-created meeting content or other information, and reflective of the collaborative discussion, topic, or focus pertaining to the asynchronous meeting. Other than direct changes to the co-created meeting content other information, user contributions may also include, but are not limited to, comments, tags, questions, and other forms of electronic documentation that can be applied to or associated with the co-created meeting content or other information.

Meanwhile, in one embodiment of the invention, the above-mentioned co-created meeting content may refer to one or more forms of information, which may facilitate the collaborative discussion, topic, and/or focus of the asynchronous meeting. By way of examples, the co-created meeting content may include, but is not limited to, one or more electronic text documents, one or more electronic slide presentations, one or more electronic images, one or more animations, one or more audio-video (AV) recordings, any other electronic multi-media, or any combination thereof.

Moreover, in one embodiment of the invention, the above-mentioned session transcript may refer to an electronic document, including text, capturing user dialogue spoken within one or more AV recordings associated with the meeting session.

Hereinafter, in one embodiment of the invention, if a session transcript had not been received (in Step 516) from a given source third-party collaboration tool service, then the process proceeds to Step 520 (see e.g., FIG. 5B). On the other hand, in another embodiment of the invention, if the session transcript had alternatively been received, then the process proceeds to Step 522 (see e.g., FIG. 5B).

Turning to FIG. 5B, in Step 520, one or more AV recordings (received in Step 516), for the meeting session, is/are processed to obtain a session transcript (described above). In one embodiment of the invention, processing of the AV recording(s) may employ any existing speech-to-text (or transcription) technique or technology.

In Step 522, one or more meeting management structures is/are maintained (or updated) using the set of user contributions, co-created meeting content, and/or the session transcript (received in Step 516 and/or Step 520). Specifically, in one embodiment of the invention, any meeting management structure(s) purposed for meeting asset management (see e.g., FIG. 2A) may be maintained.

In Step 524, a determination is made as to whether the window closure criterion or criteria, for the asynchronous meeting, has been met. By way of an example, the window closure criterion/criteria may be time-based—e.g., may indicate a window termination timestamp (or a specified time period following the window activation timestamp) at which the asynchronous meeting may be set to end. By way of another example, the window closure criterion/criteria may be contribution-based—e.g., may specify the number of rounds (or cycles) of user contribution(s) and/or meeting content co-creation, from each of any subset or all meeting attendees, which should be applied throughout the asynchronous meeting. Other window closure criterion/criteria may be employed without departing from the scope of the invention.

Accordingly, in one embodiment of the invention, if it is determined that the window closure criterion/criteria, for the asynchronous meeting, has been met, then the process proceeds to Step 526. On the other hand, in another embodiment of the invention, if it is alternatively determined that the window closure criterion/criteria has not been met, then the process alternatively proceeds to Step 504, where one or more session initiation notices, from the user of one or more meeting participants, respectively, may be received.

In Step 526, following the determination (in Step 524) that the window closure criterion/criteria, for the asynchronous meeting, has been met, and thereby, following the runtime termination of the asynchronous meeting, the assorted information (e.g., the set of user contributions, co-created meeting content, and/or the session transcript) (received in 516), as well as event information (received in Step 508), across the various users (or attendees) of the asynchronous meeting, are aggregated. The aforementioned assorted information and event information, across the various users/attendees of the asynchronous meeting, may also be referred to as aggregated information.

In Step 528, the aggregated information (obtained in Step 526) is subsequently analyzed to produce meeting collateral for each user/attendee of the asynchronous meeting. In one embodiment of the invention, meeting collateral may represent key meeting-relevant information generated following a window closure of an asynchronous meeting. Examples of the produced meeting collateral may include, but are not limited to: a meeting summary or notes (also referred to as meeting minutes) descriptive of the asynchronous meeting, one or more action items assigned to the given user/attendee of the asynchronous meeting, and one or more consensus(es) reached amongst the various users/attendees of, and during, the asynchronous meeting. Further, the aforementioned analysis performed on the aggregated information may employ one or more artificial intelligence and/or machine learning algorithms directed to context extraction, keyword identification, speaker recognition, etc.

In Step 530, for the user of a given meeting participant, one or more collateral-driven requests is/are submitted to one or more target third-party collaboration tool services, respectively. In one embodiment of the invention, a collateral-driven request may include any subset of the meeting collateral (produced in Step 528), and may serve to create a data object, relevant to the purpose of a target third-party collaboration tool service, which may be presented to the user of the given meeting participant.

For example, assume that the meeting collateral includes an action item, which had been assigned to the user of the given meeting participant during the asynchronous meeting. Through a collateral-driven request, to a calendar services based target third-party collaboration tool service, a reminder or calendar appointment object, highlighting the action item, may be created within the calendar account associated with the user of the given meeting participant. Through another collateral-driven request, to a project management services based target third-party collaboration tool service, a task object, highlighting the action item, may be created (i.e., within a portfolio for the asynchronous meeting discussion, topic, or focus) within the project management account associated with the user of the given meeting participant.

Figure 6A:
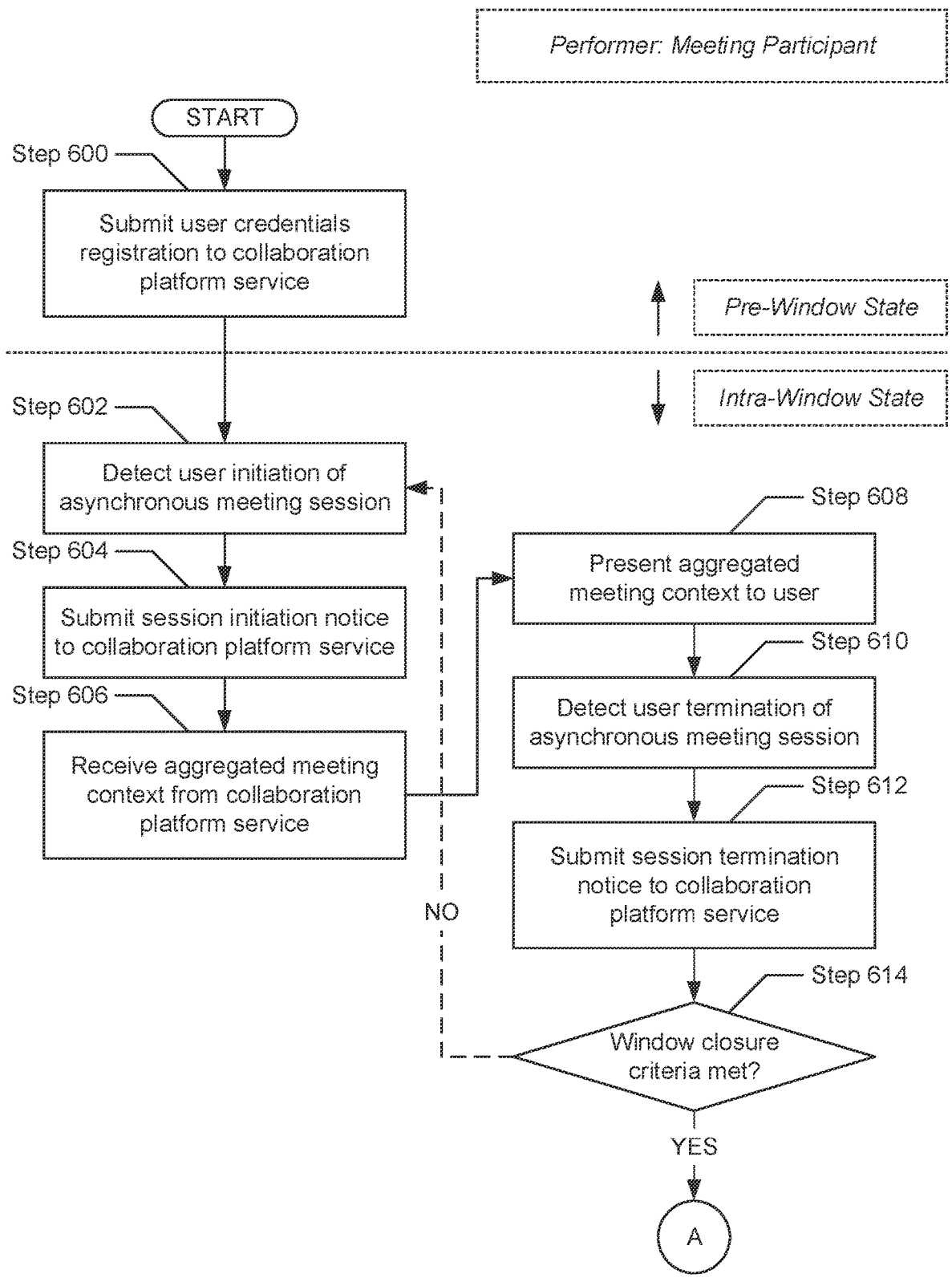
FIGS. 6A and 6B show flowcharts describing a method for meeting context continuity management in accordance with one or more embodiments of the invention.
Figure 6B:
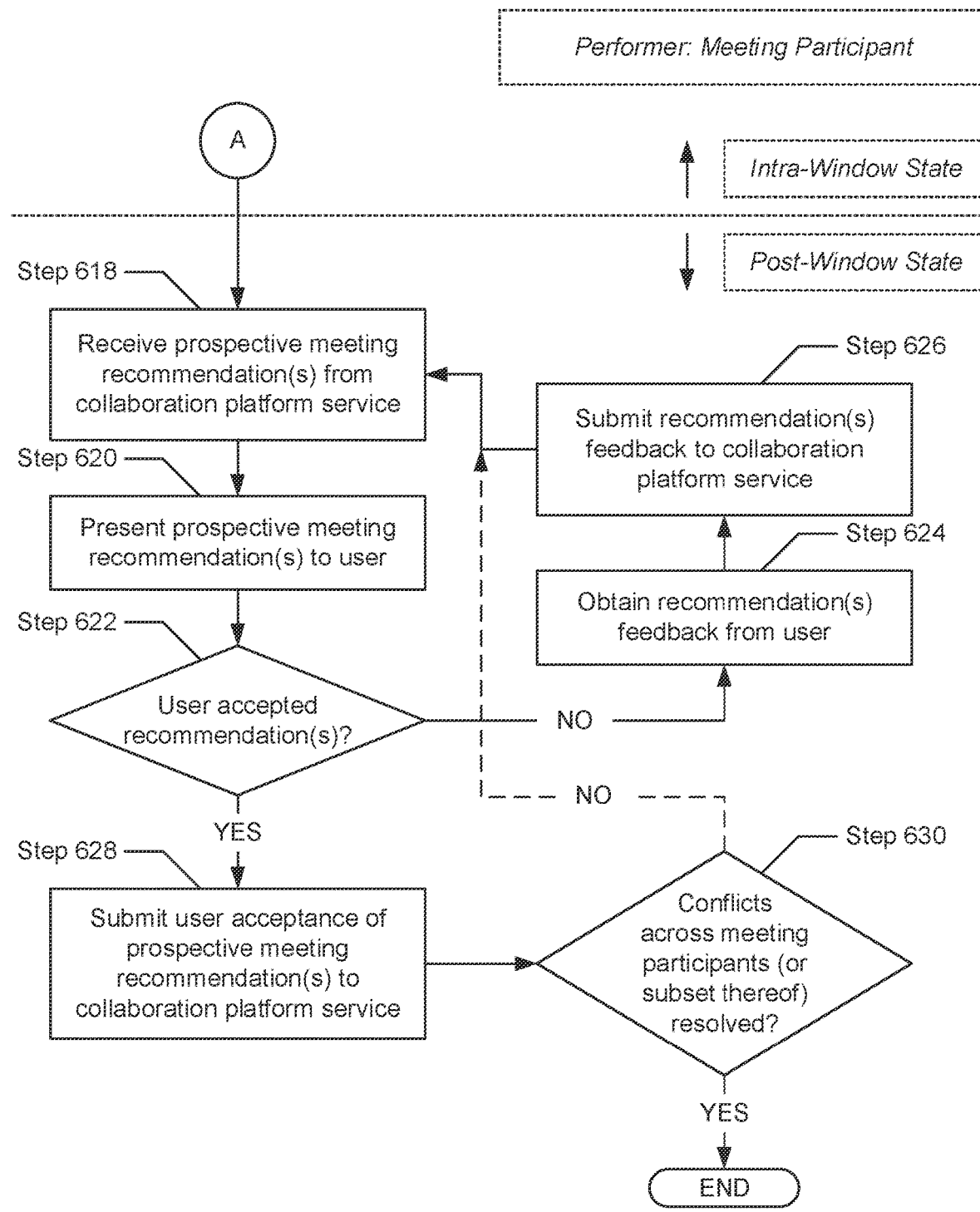

FIGS. 6A and 6B show flowcharts describing a method for meeting context continuity management in accordance with one or more embodiments of the invention. The various steps outlined below may be performed by any meeting participant (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 6A, in Step 600, a user credentials registration is submitted to the collaboration platform service (see e.g., FIG. 1). In one embodiment of the invention, the user credentials registration may include user credentials necessary to authenticate a user of the meeting participant (or a respective account thereof) associated with one or more third-party collaboration tools. The user credentials, specified in the user credentials registration, may include, for example, a different user name and password authentication token for each third-party collaboration tool employed by the user of the meeting participant. Alternatively, the user credentials, specified in the user credentials registration, may include a single sign-on (or shared) user name and password authentication token that may be used across any subset or all of the third-party collaboration tools employed by the user of the meeting participant.

In Step 602, a user initiation of an asynchronous meeting session (also referred to simply as a meeting session) is detected. In one embodiment of the invention, a meeting session may refer to a portion or segment of a given asynchronous meeting, which may be exclusively conducted by a single user (e.g., the user of the meeting participant) while interfacing asynchronously (i.e., not in real-time) with other users (or attendees) of the given asynchronous meeting. Further, initiation of the meeting session, by the user, may entail, for example, their active interaction with the asynchronous meeting within the collaboration platform client operating on their respective mesh node or computing device.

In one embodiment of the invention, an asynchronous meeting may refer to a virtual collaboration setting, amongst local (i.e., co-located) and/or remote (i.e., physically distant) collaborators, which may transpire or may be conducted asynchronously (i.e., not in real-time). Further, any asynchronous meeting may be defined through a set of configuration parameters, which may be selected by an organizing attendee (i.e., a meeting organizer), or generated by the meeting participant thereof. Examples of the aforementioned configuration parameters may include, but are not limited to: a list of meeting attendees (i.e., users of two or more meeting participants); a meeting identifier (ID) assigned to the asynchronous meeting; a meeting series ID assigned to an asynchronous meeting series (or a collection of related asynchronous meetings) with which the asynchronous meeting may be associated; a window activation timestamp referencing a prospective date and/or time at which the asynchronous meeting is set to commence; and a window closure criterion (or criteria) describing one or more conditions or rules, which may mark a termination of the asynchronous meeting.

In one embodiment of the invention, the above-mentioned window (or meeting window) of an asynchronous meeting may reference an elapsed time (i.e., a span of time or difference between a specified beginning time and a specified ending time) of the asynchronous meeting, wherein any non-real-time user contributions and/or meeting content (described above) (see e.g., FIG. 2A), by/from the any meeting attendee within the list of meeting attendees, are permitted.

In Step 604, in response to the user initiation of a meeting session (detected in Step 602), a session initiation notice is submitted to the collaboration platform service. Thereafter, in Step 606, aggregated meeting context is received from the collaboration platform service. In one embodiment of the invention, the aggregated meeting context may reflect contextual information (e.g., a meeting summary, a set of meeting notes or minutes, meeting agenda, etc.) descriptive of the asynchronous meeting.

In Step 608, the aggregated meeting context (received in Step 606) is subsequently presented to the user of the meeting participant. In one embodiment of the invention, presentation of the aggregated meeting context at the beginning of each meeting session may ensure context continuity throughout the asynchronous meeting.

In Step 610, a user termination of the meeting session (for which an initiation by the user had been detected in Step 602) is subsequently detected. In one embodiment of the invention, termination of the meeting session, by the user, may entail, for example, their inactivity with the asynchronous meeting, for a predefined period of time, within the collaboration platform client operating on their respective mesh node or computing device. Further, between the user initiation and user termination of the meeting session, the user of the meeting participant may engage in one or more activities pertinent to the asynchronous meeting—examples of which may include, but are not limited to: the co-creation of meeting content associated with the asynchronous meeting; and the furnishing of one or more user contributions (described above) (see e.g. FIG. 2A) pertinent to the asynchronous meeting.

In Step 612, in response to the user termination of a meeting session (detected in Step 610), a session termination notice is submitted to the collaboration platform service. Thereafter, in Step 614, a determination is made as to whether the window closure criterion or criteria, for the asynchronous meeting, has been met. By way of an example, the window closure criterion/criteria may be time-based—e.g., may indicate a window termination timestamp (or a specified time period following the window activation timestamp) at which the asynchronous meeting may be set to end. By way of another example, the window closure criterion/criteria may be contribution-based—e.g., may specify the number of rounds (or cycles) of user contribution(s) and/or meeting content co-creation, from each of any subset or all meeting attendees, which should be applied throughout the asynchronous meeting. Other window closure criterion/criteria may be employed without departing from the scope of the invention.

Accordingly, in one embodiment of the invention, if it is determined that the window closure criterion/criteria, for the asynchronous meeting, has been met, then the process proceeds to Step 618 (see e.g., FIG. 6B). On the other hand, in another embodiment of the invention, if it is alternatively determined that the window closure criterion/criteria has not been met, then the process alternatively proceeds to Step 602, where the user initiation of another meeting session is detected.

Turning to FIG. 6B, in Step 618, following the determination (in Step 614) that the window closure criterion/criteria, for the asynchronous meeting, has been met, and thereby, following the runtime termination of the asynchronous meeting, one or more prospective meeting recommendations is/are received from the collaboration platform service. In one embodiment of the invention, a prospective meeting recommendation may refer to a proposed or suggested calendar appointment for a future asynchronous meeting, which may pertain to the collaborative discussion, topic, or focus of the asynchronous meeting (or at least a sub-portion thereof). The future asynchronous meeting may involve all the attendees (or at least a subset thereof) of the asynchronous meeting. Further, the future date and/or time (i.e., timestamp) of the future asynchronous meeting may have been proposed or suggested, for example, in consideration of: (a) the current availability of the prospective attendees of the future asynchronous meeting based on user calendar information and analysis; and (b) a set of meeting dependencies inferred for the future asynchronous meeting.

In one embodiment of the invention, a meeting dependency may identify another asynchronous meeting, past, current, or future, which should be conducted chronological prior to the future asynchronous meeting—i.e., in chronological alignment of tasks, workloads, etc. associated with the collaborative discussion, topic, or focus of the asynchronous meeting series. For example, it may be inferred that a future asynchronous meeting, to be directed to the manufacturing of a widget, should be scheduled following another future asynchronous meeting that may be directed to the designing of the widget, as a designing phase is often understood to precede a manufacturing phase.

In Step 620, the prospective meeting recommendation(s) (received in Step 618) is/are subsequently presented to the user of the meeting participant. In Step 622, a determination is made as to whether the user accepted the prospective meeting recommendation(s). In one embodiment of the invention, if it is determined that the user accepted each of the prospective meeting recommendation(s) (received in Step 618), then the process proceeds to Step 628. On the other hand, in another embodiment of the invention, if it is alternatively determined that the user declined or rejected any of the prospective meeting recommendation(s), then the process alternatively proceeds to Step 624.

In Step 624, following the determination (in Step 622) that the user of the meeting participant has declined/rejected at least one of the prospective meeting recommendation(s) (received in Step 618), recommendation feedback, for each of the at least one declined/rejected prospective meeting recommendation(s), is obtained from the user. In one embodiment of the invention, any given recommendation feedback, pertaining to a given declined/rejected prospective meeting recommendation, may encompass: another proposed/suggested timestamp (i.e., date and/or time) to hold or conduct the future asynchronous meeting; and/or revisions to any meeting dependencies (or inferences obtained therefrom) associated with the future asynchronous meeting.

In Step 626, the recommendation feedback (obtained in Step 624), for any declined/rejected prospective meeting recommendation, is submitted to the collaboration service for consideration. Hereinafter, the process subsequently proceeds to Step 618, where one or more new (or alternative) prospective meeting recommendations—replacing any declined/rejected prospective meeting recommendation(s) and accounting for the recommendation feedback (submitted in Step 626)—is/are received from the collaboration platform service.

In Step 628, following the alternative determination (in Step 622) that the user of the meeting participant has accepted the prospective meeting recommendation(s) (received in Step 618), an acceptance response, to the prospective meeting recommendation(s), is submitted to the collaboration platform service.

In Step 630, a determination is made as to whether all scheduling (or calendar) conflicts, across the prospective attendees of the future asynchronous meeting(s), has been resolved. In one embodiment of the invention, if it is determined that all scheduling conflicts have been resolved, then the process ends. On the other hand, in another embodiment of the invention, if it is alternatively determined that all scheduling conflicts have not been resolved, then the process alternatively proceeds to Step 618, where one or more new (or alternative) prospective meeting recommendations, which attempt to resolve the scheduling conflicts, may be received from the collaboration platform service.

Figure 7A:
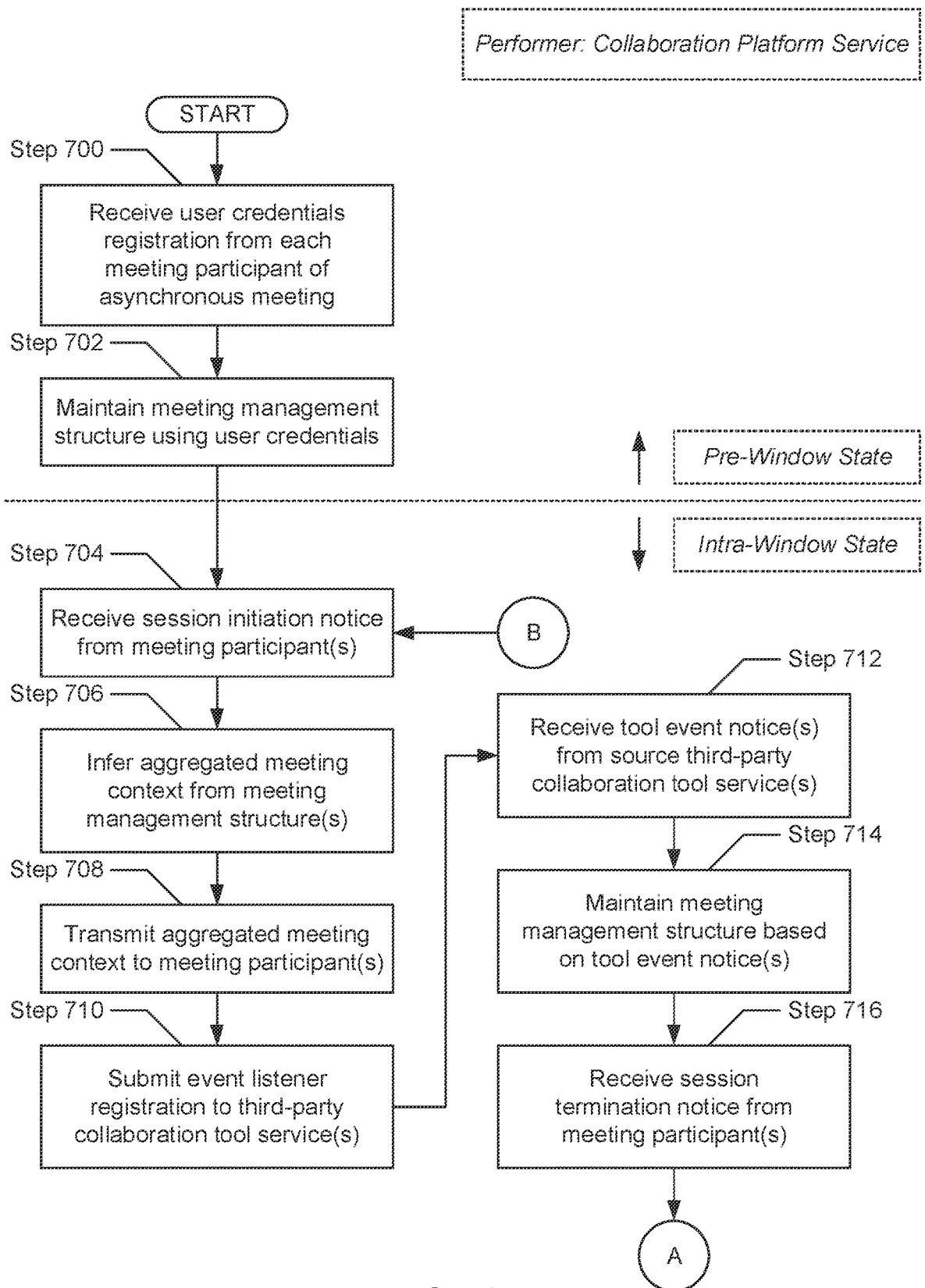
FIGS. 7A-7C show flowcharts describing a method for meeting context continuity management in accordance with one or more embodiments of the invention.
Figure 7B:
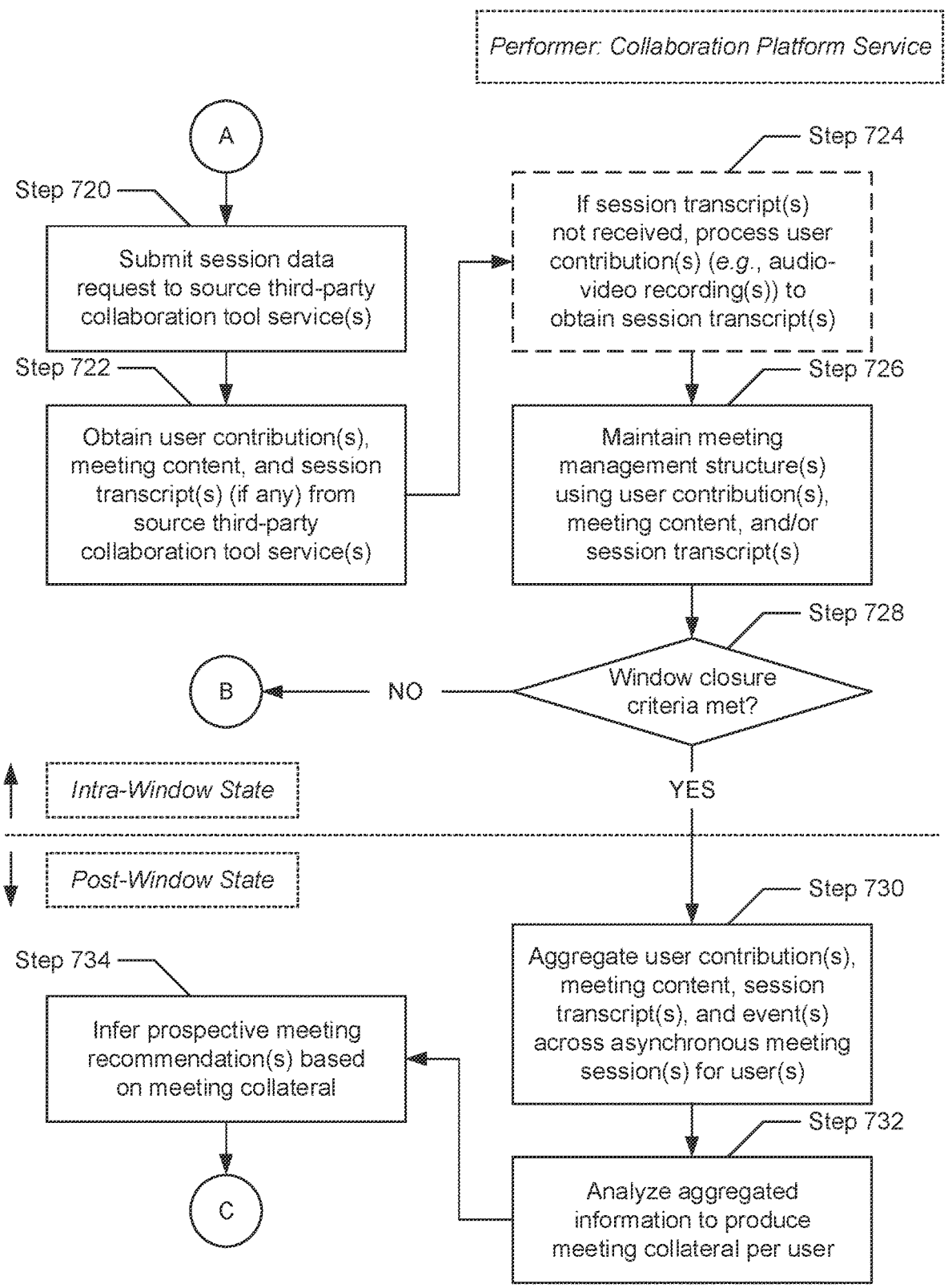
Figure 7C:
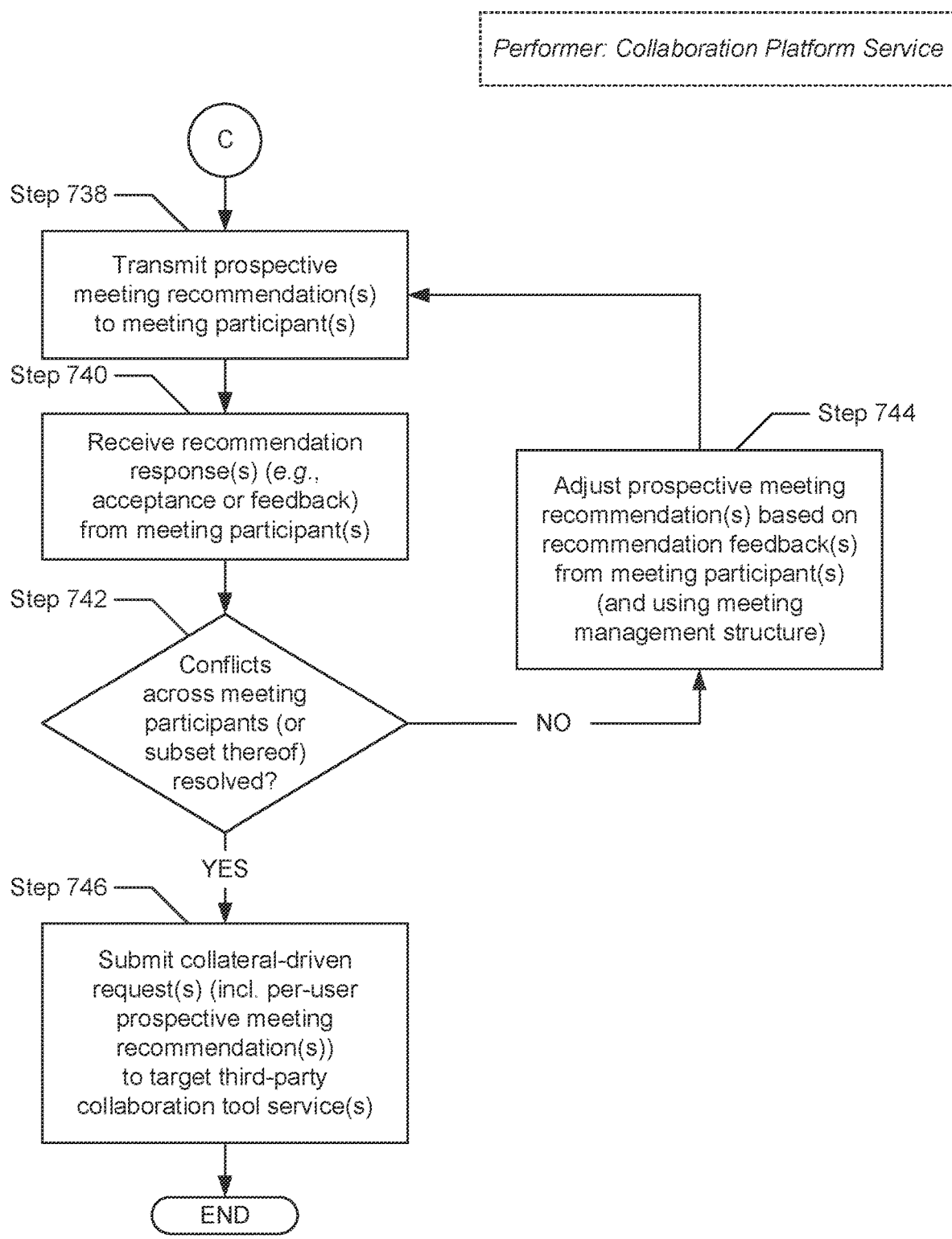

FIGS. 7A-7C show flowcharts describing a method for meeting context continuity management in accordance with one or more embodiments of the invention. The various steps outlined below may be performed by the collaboration platform service (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 7A, in Step 700, a user credentials registration is received from each meeting participant (described above) (see e.g., FIG. 1) associated with an asynchronous meeting. Generally, in one embodiment of the invention, an asynchronous meeting may refer to a virtual collaboration setting, amongst local (i.e., co-located) and/or remote (i.e., physically distant) collaborators, which may transpire or may be conducted asynchronously (i.e., not in real-time). Further, any asynchronous meeting may be defined through a set of configuration parameters, which may be selected by an organizing attendee (i.e., a meeting organizer), or generated by the meeting participant thereof. Examples of the aforementioned configuration parameters may include, but are not limited to: a list of meeting attendees (i.e., users of two or more meeting participants); a meeting identifier (ID) assigned to the asynchronous meeting; a meeting series ID assigned to an asynchronous meeting series (or a collection of related asynchronous meetings) with which the asynchronous meeting may be associated; a window activation timestamp referencing a prospective date and/or time at which the asynchronous meeting is set to commence; and a window closure criterion (or criteria) describing one or more conditions or rules, which may mark a termination of the asynchronous meeting.

In one embodiment of the invention, the above-mentioned window (or meeting window) of an asynchronous meeting may reference an elapsed time (i.e., a span of time or difference between a specified beginning time and a specified ending time) of the asynchronous meeting, wherein any non-real-time user contributions and/or meeting content (described above) (see e.g., FIG. 2A), by/from the any meeting attendee within the list of meeting attendees, are permitted.

Furthermore, in one embodiment of the invention, the above-mentioned user credentials registration, from a given meeting participant, may include user credentials necessary to authenticate a user of the given meeting participant (or a respective account thereof) associated with one or more third-party collaboration tools. The user credentials, specified in the user credentials registration, may include, for example, a different user name and password authentication token for each third-party collaboration tool employed by the user of the given meeting participant. Alternatively, the user credentials, specified in the user credentials registration, may include a single sign-on (or shared) user name and password authentication token that may be used across any subset or all of the third-party collaboration tools employed by the user of the given meeting participant.

In Step 702, a meeting management structure, instantiated for each meeting participant (or rather, the respective user thereof), is maintained (or updated) using the user credentials for the respective user (received in Step 700). Specifically, in one embodiment of the invention, any meeting management structure(s) purposed for user-associated third-party collaboration tool management (see e.g., FIG. 2D) may be maintained.

In Step 704, a session initiation notice is received from one or more meeting participants associated with the asynchronous meeting. In one embodiment of the invention, a session initiation notice may inform the collaboration platform service that a user for a given meeting participant has initiated a meeting session associated with the asynchronous meeting. A meeting session may refer to a portion or segment of the asynchronous meeting, which may be exclusively conducted by a single user (e.g., the user of the given meeting participant) while interfacing asynchronously (i.e., not in real-time) with other users (or attendees) of the asynchronous meeting.

In Step 706, in response to receiving the session initiation notice from a given meeting participant (in Step 704), aggregated meeting context is inferred from information maintained on one or more meeting management structures. In one embodiment of the invention, the aggregated meeting context may reflect contextual information (e.g., a meeting summary, a set of meeting notes or minutes, meeting agenda, etc.) descriptive of the asynchronous meeting. Further, specifically, information retrieved from any meeting management structure(s) purposed for meeting asset management (see e.g., FIG. 2A) may be used. Thereafter, in Step 708, the aggregated meeting context (inferred in Step 706) is transmitted to the given meeting participant.

In Step 710, as it pertains to a given meeting participant, an event listener registration is subsequently submitted to one or more third-party collaboration tool services (see e.g., FIG. 1). In one embodiment of the invention, the event listener registration may include the user credentials (received in Step 700) for the user of the given meeting participant. Further, the event listener registration may reflect a request to receive, or be notified of, any events logging interactions, by the user, while using a third-party collaboration tool client associated with the third-party collaboration tool service(s).

In Step 712, one or more tool event notices is/are received from one or more source third-party collaboration tool services. In one embodiment of the invention, a tool event notice may refer to a notification informing of the occurrence of a user-driven interactive event within the environment of a third-party collaboration tool client. Any given tool event notice, accordingly, may pertain to the user of a given meeting participant. Examples of a user-driven interactive event may include, but are not limited to: comments contributed by the given meeting participant; tasks completed by the given meeting participant; and the receipt of co-created content by the given meeting participant.

In Step 714, a meeting management structure, instantiated for one or more meeting participants (or rather, the respective user(s) thereof), is maintained (or updated) using the tool event notice(s) for the respective user(s) (received in Step 712). Specifically, in one embodiment of the invention, any meeting management structure(s) purposed for user-associated third-party collaboration tool management (see e.g., FIG. 2D) may be maintained.

In Step 716, a session termination notice is received from one or more meeting participants associated with the asynchronous meeting. In one embodiment of the invention, a session termination notice may inform the collaboration platform service that a user for a given meeting participant has terminated a meeting session (related to the session initiation notice received in Step 704) associated with the asynchronous meeting.

Turning to FIG. 7B, in Step 720, in response to receiving the session termination notice from a given meeting participant (in Step 716), a session data request is submitted to each of the source third-party collaboration tool service(s) (from which at least one tool event notice had been received in Step 712). In one embodiment of the invention, the session data request may query a given source third-party collaboration tool service for any works and/or information capturing the interaction(s), conducted by the user of the given meeting participant, while using the third-party collaboration tool client, associated with the given source third-party collaboration tool service, throughout their meeting session (for which the session termination notice had been received in Step 716).

In Step 722, in response to the session data request (submitted in Step 720) to a given source third-party collaboration tool service, a set of user contributions, co-created meeting content, and/or a session transcript (if available) is/are received from the given source third-party collaboration tool service. In one embodiment of the invention, a user contribution may encompass any authorized form of adjustment (or manipulation)—e.g., amendment, edit, deletion, correction, insertion, etc.—to co-created meeting content or other information, and reflective of the collaborative discussion, topic, or focus pertaining to the asynchronous meeting. Other than direct changes to the co-created meeting content other information, user contributions may also include, but are not limited to, comments, tags, questions, and other forms of electronic documentation that can be applied to or associated with the co-created meeting content or other information.

Meanwhile, in one embodiment of the invention, the above-mentioned co-created meeting content may refer to one or more forms of information, which may facilitate the collaborative discussion, topic, and/or focus of the asynchronous meeting. By way of examples, the co-created meeting content may include, but is not limited to, one or more electronic text documents, one or more electronic slide presentations, one or more electronic images, one or more animations, one or more audio-video (AV) recordings, any other electronic multi-media, or any combination thereof.

Moreover, in one embodiment of the invention, the above-mentioned session transcript may refer to an electronic document, including text, capturing user dialogue spoken within one or more AV recordings associated with the meeting session.

Hereinafter, in one embodiment of the invention, if a session transcript had not been received (in Step 722) from a given source third-party collaboration tool service, then the process proceeds to Step 724. On the other hand, in another embodiment of the invention, if the session transcript had alternatively been received, then the process proceeds to Step 726.

In Step 724, one or more AV recordings (received in Step 722), for the meeting session, is/are processed to obtain a session transcript (described above). In one embodiment of the invention, processing of the AV recording(s) may employ any existing speech-to-text (or transcription) technique or technology.

In Step 726, one or more meeting management structures is/are maintained (or updated) using the set of user contributions, co-created meeting content, and/or the session transcript (received in Step 722 and/or Step 724). Specifically, in one embodiment of the invention, any meeting management structure(s) purposed for meeting asset management (see e.g., FIG. 2A) may be maintained.

In Step 728, a determination is made as to whether the window closure criterion or criteria, for the asynchronous meeting, has been met. By way of an example, the window closure criterion/criteria may be time-based—e.g., may indicate a window termination timestamp (or a specified time period following the window activation timestamp) at which the asynchronous meeting may be set to end. By way of another example, the window closure criterion/criteria may be contribution-based—e.g., may specify the number of rounds (or cycles) of user contribution(s) and/or meeting content co-creation, from each of any subset or all meeting attendees, which should be applied throughout the asynchronous meeting. Other window closure criterion/criteria may be employed without departing from the scope of the invention.

Accordingly, in one embodiment of the invention, if it is determined that the window closure criterion/criteria, for the asynchronous meeting, has been met, then the process proceeds to Step 730. On the other hand, in another embodiment of the invention, if it is alternatively determined that the window closure criterion/criteria has not been met, then the process alternatively proceeds to Step 704, where one or more session initiation notices, from the user of one or more meeting participants, respectively, may be received.

In Step 730, following the determination (in Step 728) that the window closure criterion/criteria, for the asynchronous meeting, has been met, and thereby, following the runtime termination of the asynchronous meeting, the assorted information (e.g., the set of user contributions, co-created meeting content, and/or the session transcript) (received in Step 722 and/or Step 724), as well as event information (received in Step 712), across the various users (or attendees) of the asynchronous meeting, are aggregated. The aforementioned assorted information and event information, across the various users/attendees of the asynchronous meeting, may also be referred to as aggregated information.

In Step 732, the aggregated information (obtained in Step 730) is subsequently analyzed to produce meeting collateral for each user/attendee of the asynchronous meeting. In one embodiment of the invention, meeting collateral may represent key meeting-relevant information generated following a window closure of an asynchronous meeting. Examples of the produced meeting collateral may include, but are not limited to: a meeting summary or notes (also referred to as meeting minutes) descriptive of the asynchronous meeting, one or more action items assigned to the given user/attendee of the asynchronous meeting, and one or more consensus(es) reached amongst the various users/attendees of, and during, the asynchronous meeting. Further, the aforementioned analysis performed on the aggregated information may employ one or more artificial intelligence and/or machine learning algorithms directed to context extraction, keyword identification, speaker recognition, etc.

In Step 734, based on the meeting collateral (produced in Step 732), one or more prospective meeting recommendations is/are inferred for the user of a given meeting participant. In one embodiment of the invention, a prospective meeting recommendation may refer to a proposed or suggested calendar appointment for a future asynchronous meeting, which may pertain to the collaborative discussion, topic, or focus of the asynchronous meeting (or at least a sub-portion thereof). The future asynchronous meeting may involve all the attendees (or at least a subset thereof) of the asynchronous meeting. Further, the future date and/or time (i.e., timestamp) of the future asynchronous meeting may have been proposed or suggested, for example, in consideration of: (a) the current availability of the prospective attendees of the future asynchronous meeting based on user calendar information and analysis; and (b) a set of meeting dependencies inferred for the future asynchronous meeting. Inference of the prospective meeting recommendation(s) may employ artificial intelligence and/or machine learning.

In one embodiment of the invention, a meeting dependency may identify another asynchronous meeting, past, current, or future, which should be conducted chronological prior to the future asynchronous meeting—i.e., in chronological alignment of tasks, workloads, etc. associated with the collaborative discussion, topic, or focus of the asynchronous meeting series. For example, it may be inferred that a future asynchronous meeting, to be directed to the manufacturing of a widget, should be scheduled following another future asynchronous meeting that may be directed to the designing of the widget, as a designing phase is often understood to precede a manufacturing phase.

Turning to FIG. 7C, in Step 738, the prospective meeting recommendation(s) (inferred in Step 734) is/are transmitted to the meeting participant(s). Thereafter, in Step 740, from each meeting participant to which the prospective meeting recommendation(s) had been transmitted (in Step 738), one or more recommendation responses is/are received. In one embodiment of the invention, a recommendation response may reflect or indicate the acceptance of a given prospective meeting recommendation from the user of a given meeting participant. In another embodiment of the invention, a recommendation response may alternatively reflect or indicate the rejection of a given prospective meeting recommendation from the user of a given meeting participant.

In Step 742, a determination is made as to whether all scheduling (or calendar) conflicts, across the prospective attendees of the future asynchronous meeting(s), has been resolved. The determination, pertaining to a given future asynchronous meeting, may be contingent, at least in part, on the recommendation responses received from across the various prospective attendees of the given future asynchronous meeting. More specifically, should all such recommendation responses, from across all prospective attendees, reflect or indicate an acceptance of the prospective meeting recommendation, then all scheduling conflicts, associated with the given future asynchronous meeting, have been resolved. In contrast, should any (or at least one) such recommendation response, from across all prospective attendees, reflect or indicate a rejection of the prospective meeting recommendation, then all scheduling conflicts, associated with the given future asynchronous meeting, have not yet been resolved.

Accordingly, in one embodiment of the invention, if it is determined that all scheduling conflicts have been resolved, then the process proceeds to Step 746. On the other hand, in another embodiment of the invention, if it is alternatively determined that all scheduling conflicts have not been resolved, then the process alternatively proceeds to Step 744.

In Step 744, following the determination (in Step 742) that scheduling conflicts, across the prospective attendees of one or more given future asynchronous meetings, have not yet been resolved, recommendation feedback, for each of the at least one declined/rejected prospective meeting recommendation(s) (transmitted in Step 738), is received from the meeting participant(s) (belonging to the prospective attendee(s) affected). In one embodiment of the invention, any given recommendation feedback, pertaining to a given declined/rejected prospective meeting recommendation, may encompass: another proposed/suggested timestamp (i.e., date and/or time) to hold or conduct the future asynchronous meeting; and/or revisions to any meeting dependencies (or inferences obtained therefrom) associated with the future asynchronous meeting.

Furthermore, in one embodiment of the invention, based on received the recommendation feedback, as well as any information maintained on any meeting management structure purposed for meeting scheduling (see e.g., FIG. 2E), the prospective meeting recommendation(s) (inferred in Step 734) is/are adjusted or re-evaluated. Through said adjustment, new or alternative prospective meeting recommendation(s), which would replace the previously inferred, yet declined/rejected prospective meeting recommendation(s), is/are obtained. Hereinafter, the process proceeds to Step 738, where the new/alternative prospective meeting recommendation(s) is/are transmitted to the appropriate meeting participant(s) for consideration.

In Step 746, following the alternative determination (in Step 742) that scheduling conflicts, across the prospective attendees of one or more given future asynchronous meetings, have been resolved, one or more collateral-driven requests is/are submitted to one or more target third-party collaboration tool services. That is, in one embodiment of the invention, as a given (conflict-free) prospective meeting recommendation pertains to a given prospective meeting attendee (i.e., user of a given meeting participant), a collateral-driven request may be submitted to at least one target third-party collaboration tool service. Further, the collateral-driven request may include details (e.g., meeting context, proposed start and end timestamps, list of prospective attendees, etc.) describing the given (conflict-free) prospective meeting recommendation.

In one embodiment of the invention, in receiving a collateral-driven request, pertaining to a given prospective meeting recommendation and a given user (or meeting attendee), a target third-party collaboration tool service may create a data object, relevant to the purpose of the target third-party collaboration tool service, which may be presented to the given user through their respective target third-party collaboration tool account. For example, through a collateral-driven request, to a calendar services based target third-party collaboration tool service, a reminder or calendar appointment object, reflecting the given prospective meeting recommendation, may be created within the calendar account associated with the given user.

Figure 8A:
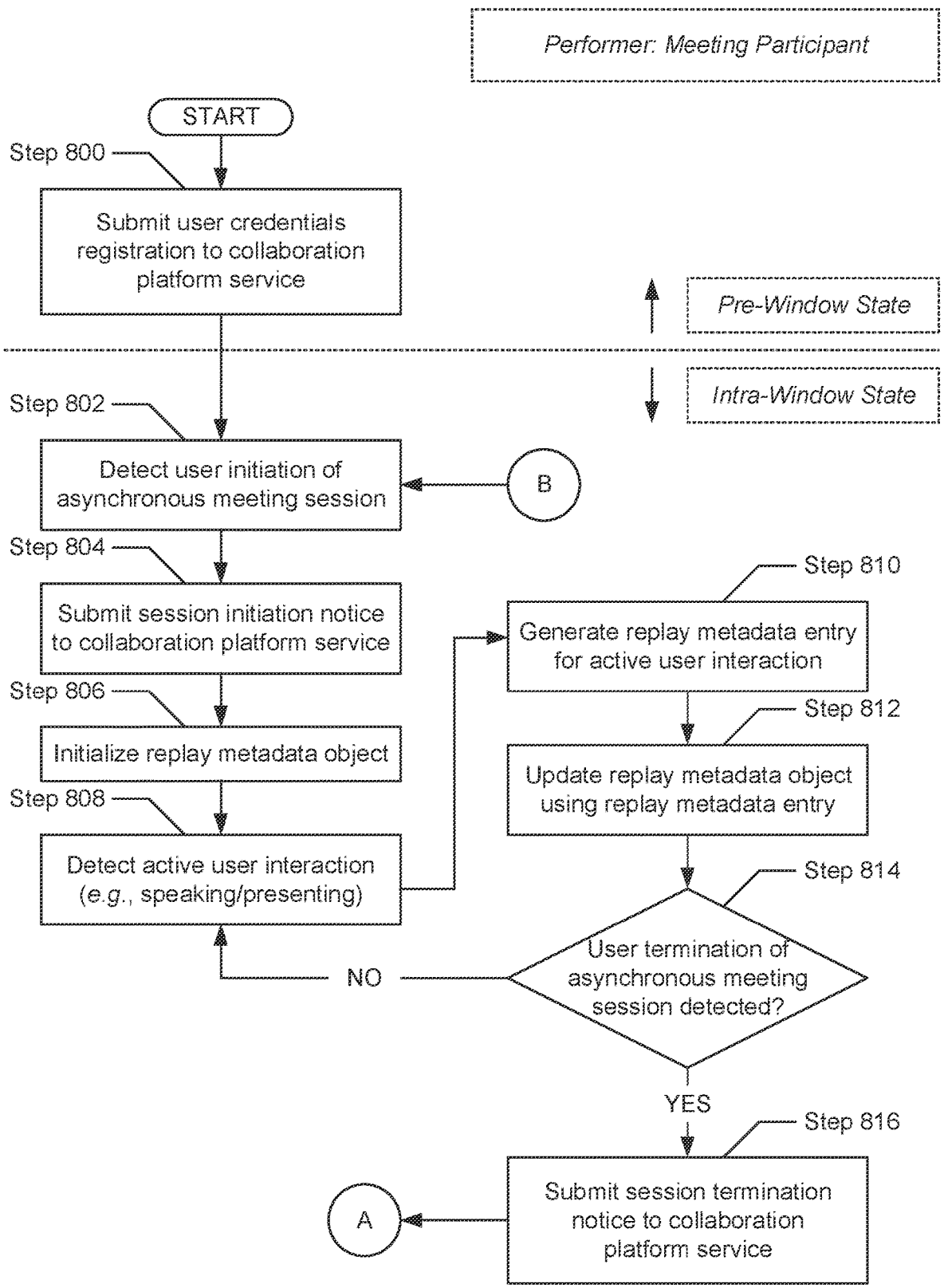
FIGS. 8A and 8B show flowcharts describing a method for segment audio-video (AV) replay management in accordance with one or more embodiments of the invention.
Figure 8B:
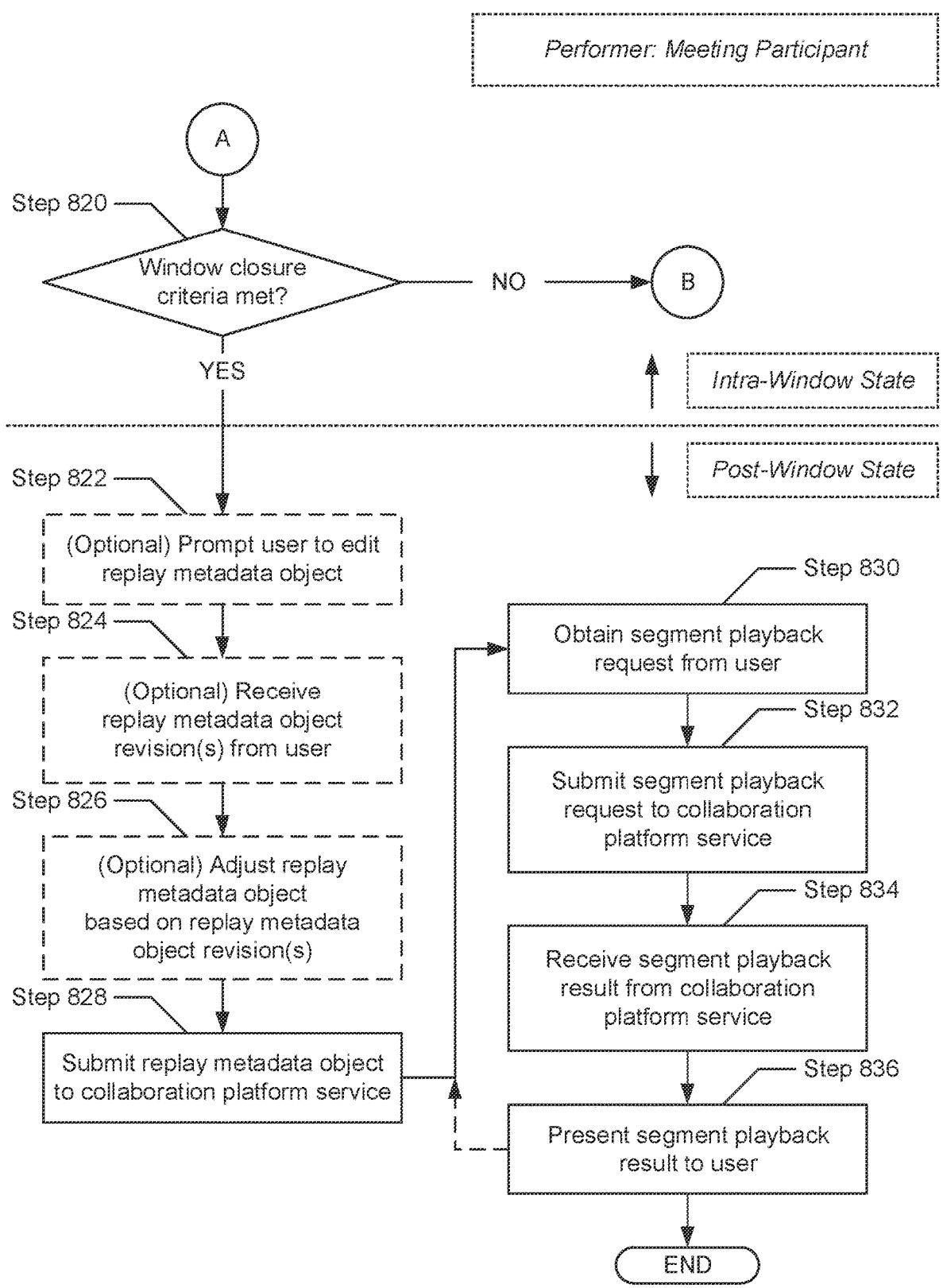

FIGS. 8A and 8B show flowcharts describing a method for segment audio-video (AV) replay management in accordance with one or more embodiments of the invention. The various steps outlined below may be performed by any meeting participant (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 8A, in Step 800, a user credentials registration is submitted to the collaboration platform service (see e.g., FIG. 1). In one embodiment of the invention, the user credentials registration may include user credentials necessary to authenticate a user of the meeting participant (or a respective account thereof) associated with one or more third-party collaboration tools. The user credentials, specified in the user credentials registration, may include, for example, a different user name and password authentication token for each third-party collaboration tool employed by the user of the meeting participant. Alternatively, the user credentials, specified in the user credentials registration, may include a single sign-on (or shared) user name and password authentication token that may be used across any subset or all of the third-party collaboration tools employed by the user of the meeting participant.

In Step 802, a user initiation of an asynchronous meeting session (also referred to simply as a meeting session) is detected. In one embodiment of the invention, a meeting session may refer to a portion or segment of a given asynchronous meeting, which may be exclusively conducted by a single user (e.g., the user of the meeting participant) while interfacing asynchronously (i.e., not in real-time) with other users (or attendees) of the given asynchronous meeting. Further, initiation of the meeting session, by the user, may entail, for example, their active interaction with the asynchronous meeting within the collaboration platform client operating on their respective mesh node or computing device.

In one embodiment of the invention, an asynchronous meeting may refer to a virtual collaboration setting, amongst local (i.e., co-located) and/or remote (i.e., physically distant) collaborators, which may transpire or may be conducted asynchronously (i.e., not in real-time). Further, any asynchronous meeting may be defined through a set of configuration parameters, which may be selected by an organizing attendee (i.e., a meeting organizer), or generated by the meeting participant thereof. Examples of the aforementioned configuration parameters may include, but are not limited to: a list of meeting attendees (i.e., users of two or more meeting participants); a meeting identifier (ID) assigned to the asynchronous meeting; a meeting series ID assigned to an asynchronous meeting series (or a collection of related asynchronous meetings) with which the asynchronous meeting may be associated; a window activation timestamp referencing a prospective date and/or time at which the asynchronous meeting is set to commence; and a window closure criterion (or criteria) describing one or more conditions or rules, which may mark a termination of the asynchronous meeting.

In one embodiment of the invention, the above-mentioned window (or meeting window) of an asynchronous meeting may reference an elapsed time (i.e., a span of time or difference between a specified beginning time and a specified ending time) of the asynchronous meeting, wherein any non-real-time user contributions and/or meeting content (described above) (see e.g., FIG. 2A), by/from the any meeting attendee within the list of meeting attendees, are permitted.

In Step 804, in response to the user initiation of a meeting session (detected in Step 802), a session initiation notice is submitted to the collaboration platform service. Thereafter, in Step 806, a replay metadata object (see e.g., FIG. 3A) is initialized. In one embodiment of the invention, the replay metadata object may refer to a data object (e.g., an electronic file) or a data structure employed, by the meeting participant, to log metadata descriptive of the current meeting session. Further, initialization of the replay metadata object may entail population of the meeting identifier (ID), meeting session ID, and user ID (see e.g., FIG. 3A) fields of the replay metadata object.

In Step 808, an active user interaction, performed by the user of the meeting participant, is detected. In one embodiment of the invention, an active user interaction may refer to an asynchronous meeting relevant action or activity. By way of an example, the act of speaking or presenting, as they may be performed by the user during meeting content co-creation, commenting, questioning, etc., may exemplify an active user interaction.

In Step 810, for the active user interaction (detected in Step 808), a replay metadata entry (see e.g., FIG. 3A) is generated. In one embodiment of the invention, the replay metadata entry may specify, but is not limited to: a segment number reflective of an identifier or index assigned to the replay metadata entry; a segment start timestamp reflective of the date and/or time that the active user interaction had been detected; a segment end timestamp reflective of a date and/or time that the active user interaction had ceased to be performed by the user; and segment metadata descriptive of the active user interaction. The segment metadata may be as detailed as conveying a context of the active user interaction. For example, for an active user interaction involving the act of speaking or presenting, the segment metadata may be populated with context that indicates the subject matter of the dialogue, or the class of dialogue (e.g., providing a comment, posing a question, describing content, etc.) associated with the active user interaction. Further, in order to obtain the detailed context, the meeting participant may employ real-time speech-to-text technology or techniques to translate the audio and/or video formatted dialogue into text and, subsequently, infer the context from the text using artificial intelligence or machine learning.

In Step 812, the replay metadata object (initialized in Step 806 or updated in a previous iteration of Step 812) is updated to include the replay metadata entry (generated in Step 810). Thereafter, in Step 814, a determination is made as to whether a user termination of the meeting session (initiated in Step 802) has been detected. A termination of the meeting session, by the user, may entail, for example, their inactivity with the asynchronous meeting, for a predefined period of time, within the collaboration platform client operating on their respective mesh node or computing device.

Accordingly, in one embodiment of the invention, if it is determined that a user termination of the meeting session (initiated in Step 802) had been detected, then the process proceeds to Step 816. On the other hand, in another embodiment of the invention, if it is alternatively determined that a user termination of the meeting session has yet to be detected, then the process alternatively proceeds to Step 808, where the meeting participant waits until another active user interaction is detected.

In Step 816, following the determination (in Step 814) that a user termination of the meeting session (initiated in Step 802) has been detected, a session termination notice is submitted to the collaboration platform service.

Turning to FIG. 8B, in Step 820, a determination is made as to whether the window closure criterion or criteria, for the asynchronous meeting, has been met. By way of an example, the window closure criterion/criteria may be time-based—e.g., may indicate a window termination timestamp (or a specified time period following the window activation timestamp) at which the asynchronous meeting may be set to end. By way of another example, the window closure criterion/criteria may be contribution-based—e.g., may specify the number of rounds (or cycles) of user contribution(s) and/or meeting content co-creation, from each of any subset or all meeting attendees, which should be applied throughout the asynchronous meeting. Other window closure criterion/criteria may be employed without departing from the scope of the invention.

Accordingly, in one embodiment of the invention, if it is determined that the window closure criterion/criteria, for the asynchronous meeting, has been met, then the process proceeds to Step 802 or Step 828 (explained below). On the other hand, in another embodiment of the invention, if it is alternatively determined that the window closure criterion/criteria has not been met, then the process alternatively proceeds to Step 802, where the meeting participant waits until a user initiation of another meeting session is detected.

Following the determination (in Step 820) that the window closure criterion/criteria, for the asynchronous meeting, has been met, in one embodiment of the invention, the process may proceed to Step 822, where a series of optional steps may be performed. Alternatively, in another embodiment of the invention, the process may proceed to Step 828, where the aforementioned series of optional steps may not be performed.

In Step 822, the user of the meeting participant is prompted to edit the replay metadata object (updated in Step 812). In Step 824, in response to the aforementioned edit prompt, one or more revisions (if any) to the replay metadata object is/are received from the user. In one embodiment of the invention, a revision (if any had been received) may encompass an adjustment to at least one field specified within at least one replay metadata entry listed in the replay metadata object. By way of an example, the user may edit the segment metadata associated with one or more replay metadata entries to provide a more accurate description (or context) of the associated active user interaction(s). In Step 826, the replay metadata object is subsequently adjusted according to the revision(s) (received from the user in Step 824).

In Step 828, the replay metadata object (updated in Step 812 or adjusted in Step 826) is submitted to the collaboration platform service. Thereafter, in Step 830, a segment playback request is obtained from the user. In one embodiment of the invention, the segment playback request may refer to a query that seek to retrieve an audio-video (AV) recording segment associated with the asynchronous meeting. Further, to identify and retrieve the AV recording segment, the segment playback request may specify at least the following parameters: (a) a meeting ID associated with asynchronous meeting; (b) a user ID associated with the user of the meeting participant; and (c) a context or one or more keywords descriptive of the AV recording segment, which may correlate to the segment metadata corresponding to the sought AV recording segment.

In Step 834, in response to the segment playback request (submitted in Step 832), a segment playback result is received from the collaboration platform service. In one embodiment of the invention, the segment playback result may include the above-mentioned AV recording segment sought by the segment playback request. Following this, in Step 836, the segment playback result (received in Step 834) is presented to the user. Hereafter, the process may end or, alternatively, the process may proceed to Step 830, where another segment playback request may be received from the user.

Figure 9A:
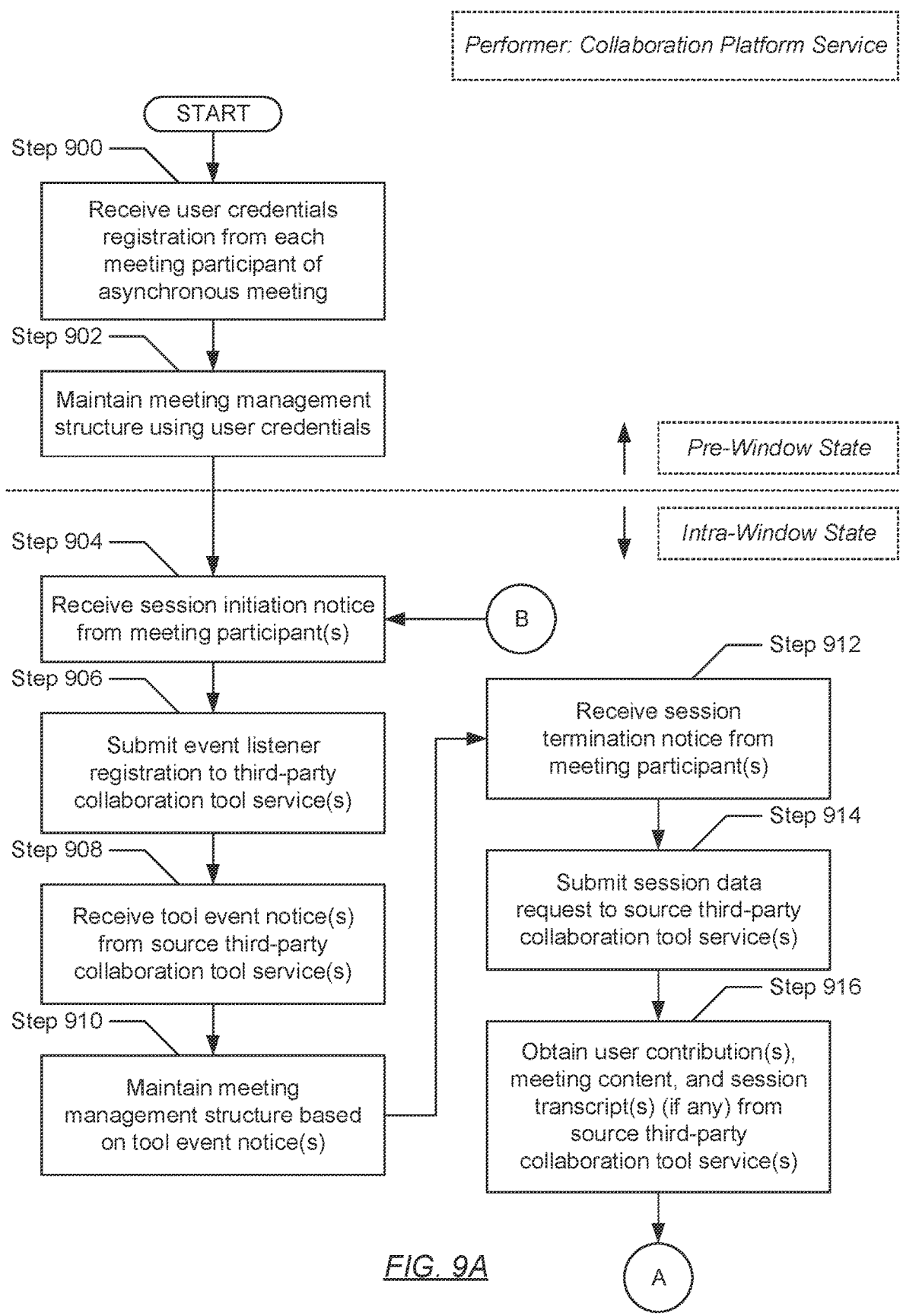
FIGS. 9A-9C show flowcharts describing a method for segment audio-video (AV) replay management in accordance with one or more embodiments of the invention.
Figure 9B:
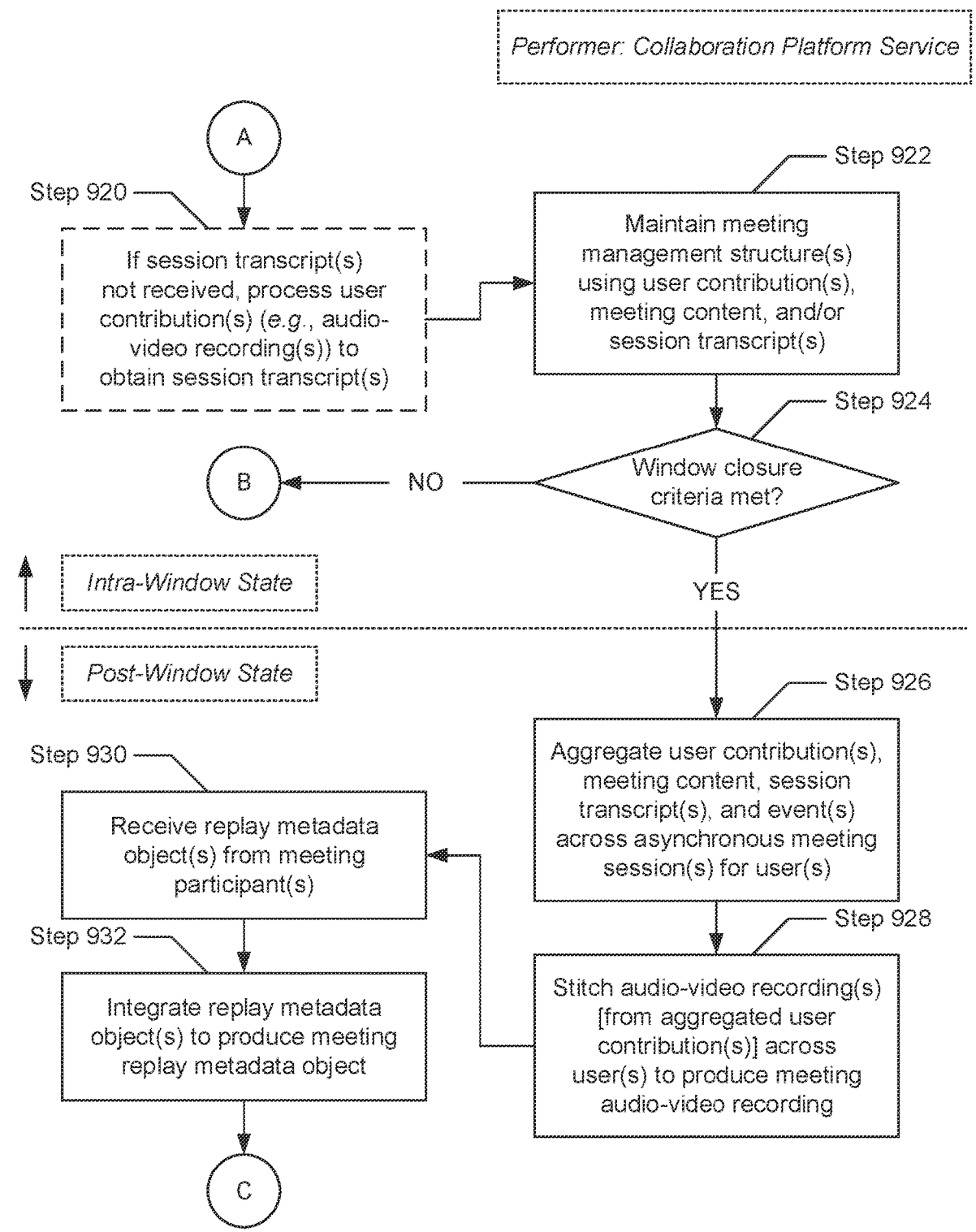
Figure 9C:
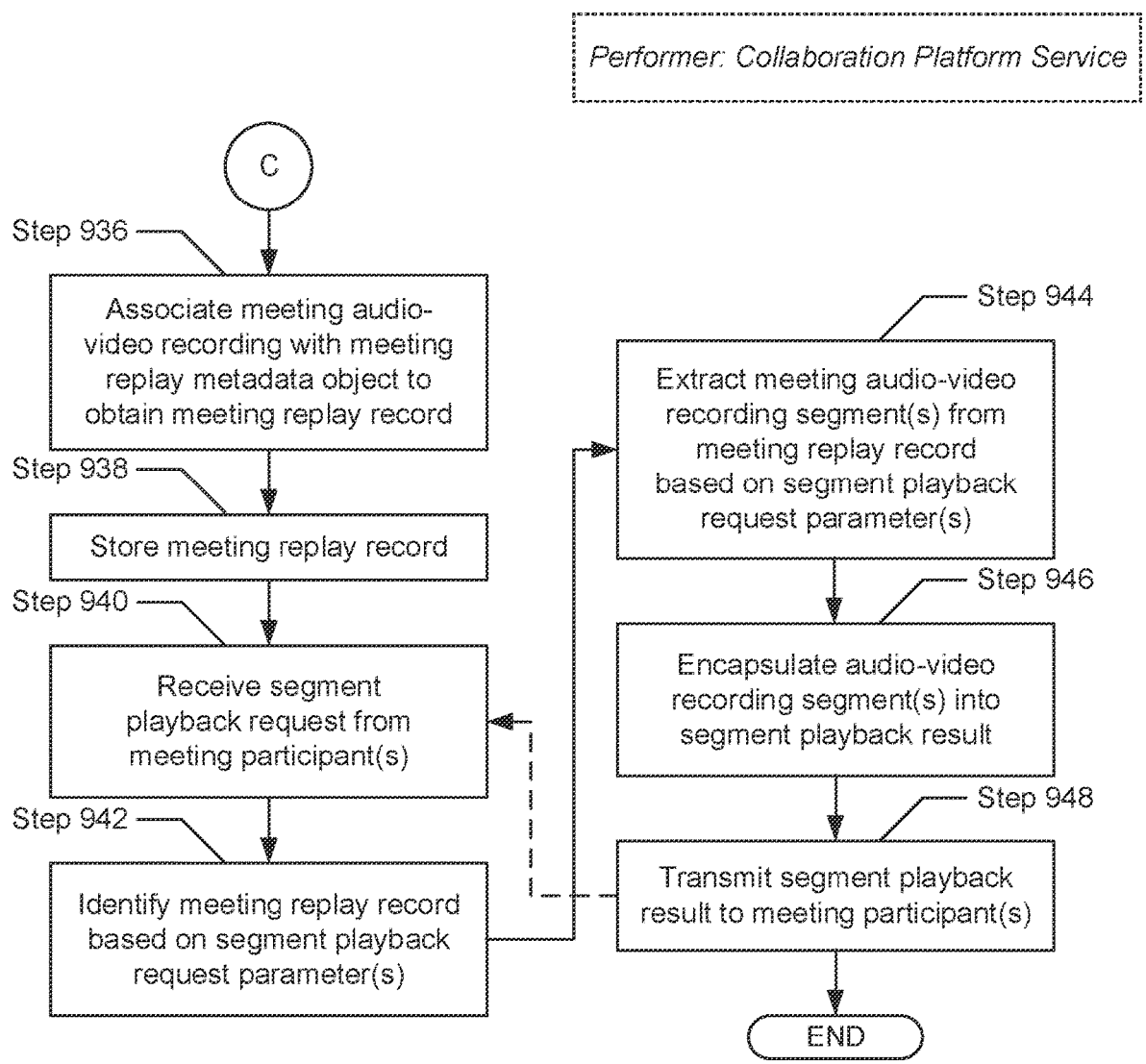

FIGS. 9A-9C show flowcharts describing a method for segment audio-video (AV) replay management in accordance with one or more embodiments of the invention. The various steps outlined below may be performed by the collaboration platform service (described above) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 9A, in Step 900, a user credentials registration is received from each meeting participant (described above) (see e.g., FIG. 1) associated with an asynchronous meeting. Generally, in one embodiment of the invention, an asynchronous meeting may refer to a virtual collaboration setting, amongst local (i.e., co-located) and/or remote (i.e., physically distant) collaborators, which may transpire or may be conducted asynchronously (i.e., not in real-time). Further, any asynchronous meeting may be defined through a set of configuration parameters, which may be selected by an organizing attendee (i.e., a meeting organizer), or generated by the meeting participant thereof. Examples of the aforementioned configuration parameters may include, but are not limited to: a list of meeting attendees (i.e., users of two or more meeting participants); a meeting identifier (ID) assigned to the asynchronous meeting; a meeting series ID assigned to an asynchronous meeting series (or a collection of related asynchronous meetings) with which the asynchronous meeting may be associated; a window activation timestamp referencing a prospective date and/or time at which the asynchronous meeting is set to commence; and a window closure criterion (or criteria) describing one or more conditions or rules, which may mark a termination of the asynchronous meeting.

In one embodiment of the invention, the above-mentioned window (or meeting window) of an asynchronous meeting may reference an elapsed time (i.e., a span of time or difference between a specified beginning time and a specified ending time) of the asynchronous meeting, wherein any non-real-time user contributions and/or meeting content (described above) (see e.g., FIG. 2A), by/from the any meeting attendee within the list of meeting attendees, are permitted.

Furthermore, in one embodiment of the invention, the above-mentioned user credentials registration, from a given meeting participant, may include user credentials necessary to authenticate a user of the given meeting participant (or a respective account thereof) associated with one or more third-party collaboration tools. The user credentials, specified in the user credentials registration, may include, for example, a different user name and password authentication token for each third-party collaboration tool employed by the user of the given meeting participant. Alternatively, the user credentials, specified in the user credentials registration, may include a single sign-on (or shared) user name and password authentication token that may be used across any subset or all of the third-party collaboration tools employed by the user of the given meeting participant.

In Step 902, a meeting management structure, instantiated for each meeting participant (or rather, the respective user thereof), is maintained (or updated) using the user credentials for the respective user (received in Step 900). Specifically, in one embodiment of the invention, any meeting management structure(s) purposed for user-associated third-party collaboration tool management (see e.g., FIG. 2D) may be maintained.

In Step 904, a session initiation notice is received from one or more meeting participants associated with the asynchronous meeting. In one embodiment of the invention, a session initiation notice may inform the collaboration platform service that a user for a given meeting participant has initiated a meeting session associated with the asynchronous meeting. A meeting session may refer to a portion or segment of the asynchronous meeting, which may be exclusively conducted by a single user (e.g., the user of the given meeting participant) while interfacing asynchronously (i.e., not in real-time) with other users (or attendees) of the asynchronous meeting.

In Step 906, in response to receiving the session initiation notice from a given meeting participant (in Step 904), an event listener registration is subsequently submitted to one or more third-party collaboration tool services (see e.g., FIG. 1). In one embodiment of the invention, the event listener registration may include the user credentials (received in Step 900) for the user of the given meeting participant. Further, the event listener registration may reflect a request to receive, or be notified of, any events logging interactions, by the user, while using a third-party collaboration tool client associated with the third-party collaboration tool service(s).

In Step 908, one or more tool event notices is/are received from one or more source third-party collaboration tool services. In one embodiment of the invention, a tool event notice may refer to a notification informing of the occurrence of a user-driven interactive event within the environment of a third-party collaboration tool client. Any given tool event notice, accordingly, may pertain to the user of a given meeting participant. Examples of a user-driven interactive event may include, but are not limited to: comments contributed by the given meeting participant; tasks completed by the given meeting participant; and the receipt of co-created content by the given meeting participant.

In Step 910, a meeting management structure, instantiated for one or more meeting participants (or rather, the respective user(s) thereof), is maintained (or updated) using the tool event notice(s) for the respective user(s) (received in Step 908). Specifically, in one embodiment of the invention, any meeting management structure(s) purposed for user-associated third-party collaboration tool management (see e.g., FIG. 2D) may be maintained.

In Step 912, a session termination notice is received from one or more meeting participants associated with the asynchronous meeting. In one embodiment of the invention, a session termination notice may inform the collaboration platform service that a user for a given meeting participant has terminated a meeting session (related to the session initiation notice received in Step 904) associated with the asynchronous meeting.

In Step 914, in response to receiving the session termination notice from a given meeting participant (in Step 912), a session data request is submitted to each of the source third-party collaboration tool service(s) (from which at least one tool event notice had been received in Step 908). In one embodiment of the invention, the session data request may query a given source third-party collaboration tool service for any works and/or information capturing the interaction(s), conducted by the user of the given meeting participant, while using the third-party collaboration tool client, associated with the given source third-party collaboration tool service, throughout their meeting session (for which the session termination notice had been received in Step 912).

In Step 916, in response to the session data request (submitted in Step 914) to a given source third-party collaboration tool service, a set of user contributions, co-created meeting content, and/or a session transcript (if available) is/are received from the given source third-party collaboration tool service. In one embodiment of the invention, a user contribution may encompass any authorized form of adjustment (or manipulation)—e.g., amendment, edit, deletion, correction, insertion, etc.—to co-created meeting content or other information, and reflective of the collaborative discussion, topic, or focus pertaining to the asynchronous meeting. Other than direct changes to the co-created meeting content other information, user contributions may also include, but are not limited to, comments, tags, questions, and other forms of electronic documentation that can be applied to or associated with the co-created meeting content or other information.

Meanwhile, in one embodiment of the invention, the above-mentioned co-created meeting content may refer to one or more forms of information, which may facilitate the collaborative discussion, topic, and/or focus of the asynchronous meeting. By way of examples, the co-created meeting content may include, but is not limited to, one or more electronic text documents, one or more electronic slide presentations, one or more electronic images, one or more animations, one or more audio-video (AV) recordings, any other electronic multi-media, or any combination thereof.

Moreover, in one embodiment of the invention, the above-mentioned session transcript may refer to an electronic document, including text, capturing user dialogue spoken within one or more AV recordings associated with the meeting session.

Hereinafter, in one embodiment of the invention, if a session transcript had not been received (in Step 916) from a given source third-party collaboration tool service, then the process proceeds to Step 920 (see e.g., FIG. 9B). On the other hand, in another embodiment of the invention, if the session transcript had alternatively been received, then the process proceeds to Step 922 (see e.g., FIG. 9B).

Turning to FIG. 9B, in Step 920, one or more AV recordings (received in Step 916), for the meeting session, is/are processed to obtain a session transcript (described above). In one embodiment of the invention, processing of the AV recording(s) may employ any existing speech-to-text (or transcription) technique or technology.

In Step 922, one or more meeting management structures is/are maintained (or updated) using the set of user contributions, co-created meeting content, and/or the session transcript (received in Step 916 and/or Step 920). Specifically, in one embodiment of the invention, any meeting management structure(s) purposed for meeting asset management (see e.g., FIG. 2A) may be maintained.

In Step 924, a determination is made as to whether the window closure criterion or criteria, for the asynchronous meeting, has been met. By way of an example, the window closure criterion/criteria may be time-based—e.g., may indicate a window termination timestamp (or a specified time period following the window activation timestamp) at which the asynchronous meeting may be set to end. By way of another example, the window closure criterion/criteria may be contribution-based—e.g., may specify the number of rounds (or cycles) of user contribution(s) and/or meeting content co-creation, from each of any subset or all meeting attendees, which should be applied throughout the asynchronous meeting. Other window closure criterion/criteria may be employed without departing from the scope of the invention.

Accordingly, in one embodiment of the invention, if it is determined that the window closure criterion/criteria, for the asynchronous meeting, has been met, then the process proceeds to Step 926. On the other hand, in another embodiment of the invention, if it is alternatively determined that the window closure criterion/criteria has not been met, then the process alternatively proceeds to Step 904, where one or more session initiation notices, from the user of one or more meeting participants, respectively, may be received.

In Step 926, following the determination (in Step 924) that the window closure criterion/criteria, for the asynchronous meeting, has been met, and thereby, following the runtime termination of the asynchronous meeting, the assorted information (e.g., the set of user contributions, co-created meeting content, and/or the session transcript) (received in 916), as well as event information (received in Step 908), across the various users (or attendees) of the asynchronous meeting, are aggregated. The aforementioned assorted information and event information, across the various users/attendees of the asynchronous meeting, may also be referred to as aggregated information.

In Step 928, the set of audio-video (AV) recordings, included in the aggregated user contribution(s) (obtained in Step 926), are stitched together in chronological order to produce a meeting AV recording—i.e., a unified AV recording capturing the various meeting sessions conducted by the two or more attendees of the asynchronous meeting. In one embodiment of the invention, production of the meeting AV recording may employ any existing AV stitching technique or technology.

In Step 930, one or more replay metadata objects is/are received from each of two or more meeting participants involved in the asynchronous meeting. In one embodiment of the invention, a replay metadata object (see e.g., FIG. 3A) may refer to a data object (e.g., an electronic file) or a data structure employed, by a given meeting participant, to log metadata descriptive of a given meeting session conducted by a given user.

In Step 932, the replay metadata objects (received in Step 930) are subsequently integrated to produce a meeting replay metadata object (see e.g., FIG. 3B). In one embodiment of the invention, the meeting replay object may refer to a data object (e.g., an electronic file) or a data structure employed, by the collaboration platform service, to aggregate metadata descriptive of a given asynchronous meeting involving a given set of users (or attendees).

Turning to FIG. 9C, in Step 936, the meeting AV recording (produced in Step 928) is then associated with the meeting replay metadata object (produced in Step 932), thereby forming or obtaining a meeting replay record. In Step 938, the meeting replay record (obtained in step 936) is subsequently stored in a record repository on the collaboration platform service.

In Step 940, a segment playback request is received from each of one or more meeting participants. In one embodiment of the invention, a segment playback request may refer to a query that seeks to retrieve an AV recording segment associated with a given asynchronous meeting. Further, to identify and retrieve a given AV recording segment, a segment playback request may specify at least the following parameters: (a) a meeting ID associated with asynchronous meeting; (b) a user ID associated with the user of the meeting participant; and (c) a context or one or more keywords descriptive of the AV recording segment, which may correlate to the segment metadata corresponding to the sought AV recording segment.

In Step 942, a meeting replay record is identified using at least a portion of the segment playback parameters (received in Step 940). Specifically, in one embodiment of the invention, a lookup may be performed across a record repository (storing various meeting replay records), at least using a provided meeting ID, to identify the meeting replay record relevant to the sought query.

In Step 944, a meeting AV recording segment is extracted from the meeting replay record (identified in Step 942). Specifically, in one embodiment of the invention, the identified meeting replay record may be processed, using at least another portion of the segment playback parameters (received in Step 940) (e.g., a provided user ID and provided context or keyword(s)), to select a user replay metadata object and, subsequently, a user replay metadata entry (see e.g., FIG. 3B), specified in the meeting replay metadata object of the identified meeting replay record. Thereafter, information included in the selected user replay metadata entry (e.g., segment start timestamp, segment end timestamp, segment metadata, etc.) may be retrieved and used to identify a portion of the meeting AV recording, of the identified meeting replay record. The identified portion of the meeting AV recording, accordingly, embodies the sought meeting AV recording segment.

In Step 946, the meeting AV recording segment (extracted in step 944) is then encapsulated within or into a segment playback result—i.e., a data object or container (e.g., an archive file, etc.). Subsequently, in Step 948, the segment playback result (obtained in Step 946) is transmitted to the appropriate meeting participant(s). Hereafter, the process may end or, alternatively, the process may proceed to Step 940, where another segment playback request may be received from one or more meeting participants.

Figure 10:
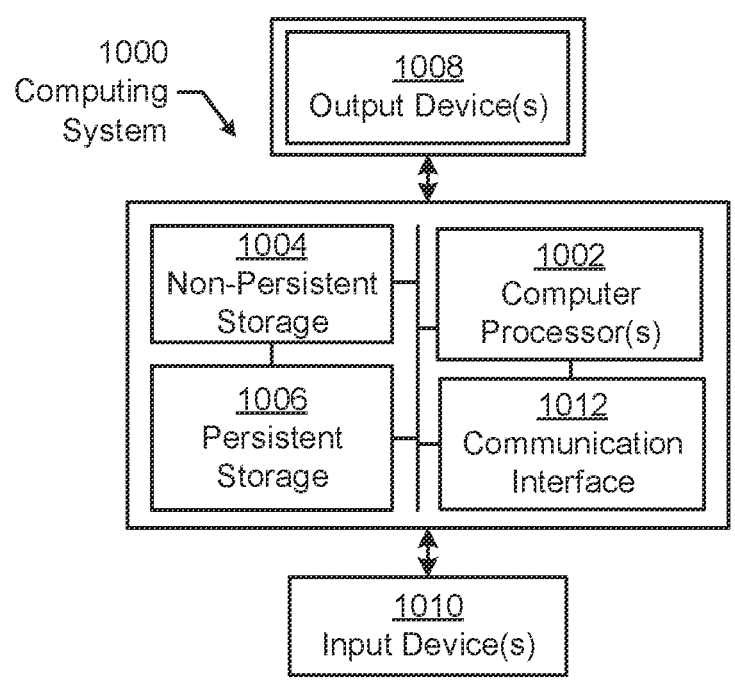
FIG. 10 shows an exemplary computing system in accordance with one or more embodiments of the invention.

FIG. 10 shows an exemplary computing system in accordance with one or more embodiments of the invention. The computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), input devices (1010), output devices (608), and numerous other elements (not shown) and functionalities. Each of these components is described below.

In one embodiment of the invention, the computer processor(s) (1002) may be an integrated circuit for processing instructions. For example, the computer processor(s) may be one or more cores or micro-cores of a central processing unit (CPU) and/or a graphics processing unit (GPU). The computing system (1000) may also include one or more input devices (1010), such as a touchscreen, keyboard, mouse, microphone, touchpad, electronic pen, or any other type of input device. Further, the communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

In one embodiment of the invention, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for asynchronous meeting management, comprising:
    performing, by a collaboration platform service and upon meeting a window closure criterion for an asynchronous meeting, a non-iterative process, comprising:
        aggregating, for a user and across a set of meeting sessions of the asynchronous meeting associated with the user, a set of session assets to obtain aggregated information;
        analyzing the aggregated information to produce meeting collateral; and
        submitting, to a target third-party collaboration tool service of a set of third-party collaboration tool services, a collateral-driven request comprising the meeting collateral,
    wherein the asynchronous meeting refers to a virtual collaboration meeting between users, using meeting participants, that does not transpire in real-time,
    wherein the window closure criterion for the asynchronous meeting is a contribution-based criterion specifying a number of rounds of user contributions received from the meeting participants after which the asynchronous meeting terminates.

2. The method of claim 1, wherein the set of session assets comprises at least one selected from a group consisting of a set of user contributions contributed by the user throughout the set of meeting sessions, meeting content contributed by the user throughout the set of meeting sessions, and a set of session transcripts associated with and obtained for the user throughout the set of meeting sessions.

3. The method of claim 1, wherein the meeting collateral comprises at least one action item relevant to the asynchronous meeting and directed to the user.

4. The method of claim 3, wherein the collateral-driven request results in a creation of at least one selected from a group consisting of a reminder object and a task object by the target third-party collaboration tool service, wherein the at least one selected from the group consisting of the reminder object and the task object associates with the at least one action item.

5. The method of claim 1, further comprising:
prior to performing the non-iterative process:
- performing, by the collaboration platform service and until the window closure criterion for the asynchronous meeting is met, an iterative process, comprising:
  - receiving a session initiation notice from a meeting participant associated with the user;
  - submitting, in response to receiving the session initiation notice, an event listener registration to the set of third-party collaboration tool services;
  - receiving, in response to the submitting the event listener registration, a tool event notice from a source third-party collaboration tool service of the set of third-party collaboration tool services; and
  - maintaining a meeting management structure based on the tool event notice.

6. The method of claim 5, further comprising:
performing, by the collaboration platform service, a continuation of the iterative process, comprising:
- receiving a session termination notice from the meeting participant associated with the user;
- submitting, in response to receiving the session termination notice, a session data request to the source third-party collaboration tool service;
- obtaining, in response to submitting the session data request, the set of session assets from the source third-party collaboration tool service; and
- maintaining at least another meeting management structure using the set of session assets.

7. A non-transitory computer readable medium (CRM) comprising computer readable program code, which when executed by a computer processor of a collaboration platform service, enables the collaboration platform service to perform a method for asynchronous meeting management, the method comprising:
performing, upon meeting a window closure criterion for an asynchronous meeting, a non-iterative process, comprising:
- aggregating, for a user and across a set of meeting sessions of the asynchronous meeting associated with the user, a set of session assets to obtain aggregated information;
- analyzing the aggregated information to produce meeting collateral; and
- submitting, to a target third-party collaboration tool service of a set of third-party collaboration tool services, a collateral-driven request comprising the meeting collateral,
wherein the asynchronous meeting refers to a virtual collaboration meeting between users, using meeting participants, that does not transpire in real-time,
wherein the window closure criterion for the asynchronous meeting is a contribution-based criterion specifying a number of rounds of user contributions received from the meeting participants after which the asynchronous meeting terminates.

8. The non-transitory CRM of claim 7, wherein the set of session assets comprises at least one selected from a group consisting of a set of user contributions contributed by the user throughout the set of meeting sessions, meeting content contributed by the user throughout the set of meeting sessions, and a set of session transcripts associated with and obtained for the user throughout the set of meeting sessions.

9. The non-transitory CRM of claim 7, wherein the meeting collateral comprises at least one action item relevant to the asynchronous meeting and directed to the user.

10. The non-transitory CRM of claim 9, wherein the collateral-driven request results in a creation of at least one selected from a group consisting of a reminder object and a task object by the target third-party collaboration tool service, wherein the at least one selected from the group consisting of the reminder object and the task object associates with the at least one action item.

11. The non-transitory CRM of claim 7, the method further comprising:
prior to performing the non-iterative process:
- performing, until the window closure criterion for the asynchronous meeting is met, an iterative process, comprising:
  - receiving a session initiation notice from a meeting participant associated with the user;
  - submitting, in response to receiving the session initiation notice, an event listener registration to the set of third-party collaboration tool services;
  - receiving, in response to the submitting the event listener registration, a tool event notice from a source third-party collaboration tool service of the set of third-party collaboration tool services; and
  - maintaining a meeting management structure based on the tool event notice.

12. The non-transitory CRM of claim 11, further comprising:
performing a continuation of the iterative process, comprising:
- receiving a session termination notice from the meeting participant associated with the user;
- submitting, in response to receiving the session termination notice, a session data request to the source third-party collaboration tool service;
- obtaining, in response to submitting the session data request, the set of session assets from the source third-party collaboration tool service; and
- maintaining at least another meeting management structure using the set of session assets.

13. A system, the system comprising:
a set of third-party collaboration tool services; and
a collaboration platform service operatively connected to the set of third-party collaboration tool services, and comprising a computer processor configured to perform a method for asynchronous meeting management, the method comprising:
performing, upon meeting a window closure criterion for an asynchronous meeting, a non-iterative process, comprising:
- aggregating, for a user and across a set of meeting sessions of the asynchronous meeting associated with the user, a set of session assets to obtain aggregated information;
- analyzing the aggregated information to produce meeting collateral; and
- submitting, to a target third-party collaboration tool service of the set of third-party collaboration tool services, a collateral-driven request comprising the meeting collateral, wherein the asynchronous meeting refers to a virtual collaboration meeting between users, using meeting participants, that does not transpire in real-time, wherein the window closure criterion for the asynchronous meeting is a contribution-based criterion specifying a number of rounds of user contributions received from the meeting participants after which the asynchronous meeting terminates.

14. The system of claim 13, wherein the set of session assets comprises at least one selected from a group consisting of a set of user contributions contributed by the user throughout the set of meeting sessions, meeting content contributed by the user throughout the set of meeting sessions, and a set of session transcripts associated with and obtained for the user throughout the set of meeting sessions.

15. The system of claim 13, wherein the meeting collateral comprises at least one action item relevant to the asynchronous meeting and directed to the user.

16. The system of claim 15, wherein the collateral-driven request results in a creation of at least one selected from a group consisting of a reminder object and a task object by the target third-party collaboration tool service, wherein the at least one selected from the group consisting of the reminder object and the task object associates with the at least one action item.

17. The system of claim 13, the system further comprising:
a mesh network operatively connected to the collaboration platform service, and comprising a plurality of mesh nodes operatively connected to one another,
wherein the user operates a mesh node of the plurality of mesh nodes.

* * * * *